(12) United States Patent
Sreedhara

(10) Patent No.: US 11,521,608 B2
(45) Date of Patent: Dec. 6, 2022

(54) METHODS AND SYSTEMS FOR CORRECTING, BASED ON SPEECH, INPUT GENERATED USING AUTOMATIC SPEECH RECOGNITION

(71) Applicant: Rovi Guides, Inc., San Jose, CA (US)

(72) Inventor: Arun Sreedhara, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 191 days.

(21) Appl. No.: 16/607,958

(22) PCT Filed: May 24, 2017

(86) PCT No.: PCT/US2017/034229
§ 371 (c)(1),
(2) Date: Oct. 24, 2019

(87) PCT Pub. No.: WO2018/217194
PCT Pub. Date: Nov. 29, 2018

(65) Prior Publication Data
US 2020/0143806 A1 May 7, 2020

(51) Int. Cl.
*G10L 15/18* (2013.01)
*G10L 15/22* (2006.01)
(Continued)

(52) U.S. Cl.
CPC ............ *G10L 15/22* (2013.01); *G06V 40/164* (2022.01); *G06V 40/176* (2022.01); *G10L 25/84* (2013.01);
(Continued)

(58) Field of Classification Search
None
See application file for complete search history.

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

EP 2 645 364 10/2013
JP 2003316386 A 11/2003
(Continued)

OTHER PUBLICATIONS

International Search Report and Written Opinion of PCT/US2017/034229 dated Apr. 19, 2018.
(Continued)

*Primary Examiner* — Seong-Ah A Shin
(74) *Attorney, Agent, or Firm* — Haley Guiliano LLP

(57) ABSTRACT

Methods and systems for correcting, based on subsequent second speech, an error in an input generated from first speech using automatic speech recognition, without an explicit indication in the second speech that a user intended to correct the input with the second speech, include determining that a time difference between when search results in response to the input were displayed and when the second speech was received is less than a threshold time, and based on the determination, correcting the input based on the second speech. The methods and systems also include determining that a difference in acceleration of a user input device, used to input the first speech and second speech, between when the search results in response to the input were displayed and when the second speech was received is less than a threshold acceleration, and based on the determination, correcting the input based on the second speech.

19 Claims, 9 Drawing Sheets

(51) Int. Cl.
*G10L 25/84* (2013.01)
*G06V 40/16* (2022.01)
*G10L 25/78* (2013.01)

(52) U.S. Cl.
CPC .. *G10L 2015/223* (2013.01); *G10L 2015/225* (2013.01); *G10L 2025/783* (2013.01)

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,249,876 B1 * | 8/2012 | Ainslie | G10L 15/22 704/235 |
| 8,577,671 B1 | 11/2013 | Barve et al. | |
| 9,123,339 B1 * | 9/2015 | Shaw | G10L 15/22 |
| 9,237,386 B2 | 1/2016 | Oztaskent et al. | |
| 9,462,342 B2 | 10/2016 | Krishnamurthy | |
| 9,514,743 B2 | 12/2016 | Skobeltsyn et al. | |
| 10,339,917 B2 * | 7/2019 | Aleksic | G10L 15/18 |
| 2002/0174430 A1 | 11/2002 | Ellis et al. | |
| 2003/0216912 A1 | 11/2003 | Chino | |
| 2005/0182504 A1 | 8/2005 | Bailey | |
| 2005/0251827 A1 | 11/2005 | Ellis et al. | |
| 2006/0182291 A1 * | 8/2006 | Kunieda | G10L 21/02 704/E21.007 |
| 2008/0134866 A1 | 6/2008 | Brown | |
| 2009/0006368 A1 | 1/2009 | Mei et al. | |
| 2009/0006388 A1 | 1/2009 | Ives et al. | |
| 2009/0228273 A1 | 9/2009 | Wang et al. | |
| 2010/0153885 A1 | 6/2010 | Yates | |
| 2012/0166438 A1 | 6/2012 | Wu et al. | |
| 2013/0097101 A1 | 4/2013 | Ortiz | |
| 2013/0262117 A1 * | 10/2013 | Eckman | G10L 15/22 704/255 |
| 2013/0294755 A1 | 11/2013 | Arme et al. | |
| 2013/0347038 A1 | 12/2013 | Lee | |
| 2014/0337370 A1 | 11/2014 | Aravamudan et al. | |
| 2015/0206535 A1 * | 7/2015 | Iwai | G10L 15/25 704/231 |
| 2015/0234820 A1 | 8/2015 | Aravamudan | |
| 2015/0279363 A1 * | 10/2015 | Furumoto | G10L 15/20 704/249 |
| 2015/0382061 A1 | 12/2015 | Maisenbacher et al. | |
| 2016/0142783 A1 | 5/2016 | Bagga et al. | |
| 2016/0188574 A1 * | 6/2016 | Homma | G06F 40/35 704/9 |
| 2016/0188729 A1 | 6/2016 | Ardhanari et al. | |
| 2016/0191999 A1 | 6/2016 | Friedrich | |
| 2016/0274744 A1 | 9/2016 | Neumann et al. | |
| 2017/0069309 A1 * | 3/2017 | Aleksic | G10L 15/22 |
| 2017/0160813 A1 * | 6/2017 | Divakaran | G06N 5/022 |
| 2018/0151176 A1 * | 5/2018 | Qian | G06V 40/20 |
| 2019/0287533 A1 * | 9/2019 | Homma | G10L 15/22 |
| 2020/0357391 A1 * | 11/2020 | Ghoshal | G10L 15/005 |

FOREIGN PATENT DOCUMENTS

| | | | |
|---|---|---|---|
| JP | 2004510209 A | | 4/2004 |
| JP | 2006209069 A | | 8/2006 |
| JP | 2008097082 A | | 4/2008 |
| JP | 2010128015 A | | 6/2010 |
| JP | 2011059194 A | | 3/2011 |
| JP | 2016062069 A | | 4/2016 |
| JP | 2016 180917 | | 10/2016 |
| JP | 2016180917 A | * | 10/2016 |
| JP | 2016180917 A | | 10/2016 |
| KR | 20070061266 B1 | | 6/2007 |
| WO | 2002027711 | | 4/2002 |
| WO | 2016020464 | | 2/2016 |

OTHER PUBLICATIONS

International Preliminary Report of Patentability of PCT/ US2017/ 034229 dated Nov. 26, 2019.

* cited by examiner

1000

```
1000  initialize matrix containing pixels of left edge and store as left
1002  initialize matrix containing pixels of right edge and store as right
1004  initialize matrix containing left and right and store as shape
1006  for each element of left
1008      store the element as left_test
1010      store the horizontal component of left_test as left_test_h
1012      store the vertical component of left_test as left_test_v
1014      find element in right having vertical component matching left_test_v and store
          as right_test
1016      left_test_h = left_test_h + 1
1018      if the horizontal component of right_test is greater than left_test_h
1020          add [left_test_h left_test_v] to shape
1022          goto line 916
1024      else
1026          goto line 906
1028      end
1030
1032  remove duplicates from shape
```

FIG. 10

METHODS AND SYSTEMS FOR CORRECTING, BASED ON SPEECH, INPUT GENERATED USING AUTOMATIC SPEECH RECOGNITION

CROSS-REFERENCE TO RELATED APPLICATIONS

This application is a national stage application under 35 U.S.C. § 371 of International Application PCT/US2017/034229, filed May 24, 2017, the disclosure of which is hereby incorporated by reference herein in its entirety.

BACKGROUND

Users may initiate searches using spoken inputs that are converted to text by automatic speech recognition (ASR). Users may also attempt to correct errors in the recognition of previous spoken inputs using subsequent spoken inputs. However, determining whether the user intends to correct a recognition error with a subsequent spoken input may be difficult, especially in the absence of an explicit indication in the subsequent spoken input, such as phrases like "No" or "I meant," that the user intends to correct a recognition error with the subsequent speech.

SUMMARY

Accordingly, systems and methods are described herein for correcting, based on speech, input generated using automatic speech recognition, in the absence of an explicit indication in the speech that a user intended to correct the input with the speech. In some embodiments, a media guidance application uses differences in time to correct, based on speech, an error in an input generated using automatic speech recognition. For example, a user may initially speak "Show me shows about Austin." The media guidance application may incorrectly recognize the speech as "Show me shows about Boston" and present search results including shows about Boston. The user may then speak "Austin," intending to correct the incorrectly recognized "Boston" with "Austin." In such a case, the user may not take a long time from when the search results are presented to speaking "Austin," because it may quickly be apparent that the search results do not match what was initially requested, and the user will not spend a long amount of time reviewing the search results before trying to correct the error. On the other hand, if the media guidance application correctly recognizes the initial speech as "Show me shows about Austin" and presents search results including shows about Austin, the user may take a long amount of time to review the search results. Therefore, in some embodiments, whether the time between presentation of search results and subsequent spoken input is long or not (i.e., whether it is greater than a threshold or not) may indicate whether a user intends to correct, with the subsequent speech, the input generated using automatic speech recognition.

In some embodiments, a media guidance application uses differences in acceleration to correct, based on speech, an error in an input generated using automatic speech recognition. For example, a user may initially speak "Show me shows about Austin." The media guidance application may incorrectly recognize the speech as "Show me shows about Boston" and present search results including shows about Boston. The user may then speak "Austin," intending to correct the incorrectly recognized "Boston" with "Austin." In such a case, the user may bring the user input device into which s/he is speaking closer to his/her mouth with the intention of enabling the user input device to more accurately detect the subsequent spoken "Austin." This motion of the user input device may be detected as a change in acceleration of the user input device between when the search results are presented and when the user speaks "Austin." This change in acceleration may therefore indicate whether a user intends to correct, with the subsequent speech, the input generated using automatic speech recognition.

To these ends, in some aspects, a media guidance application corrects, based on speech, input generated using automatic speech recognition, in the absence of an explicit indication in the speech that a user intended to correct the input with the speech. Specifically, in some embodiments, a media guidance application receives, via a user input device, first speech. The first speech may include, for example, words spoken by a user. For example, the first speech may be "Show me shows about Austin."

In some embodiments, the media guidance application determines, using automatic speech recognition, a first input based on the first speech. For example, if the first speech is "Show me shows about Austin," the media guidance application may determine the first input to be "Show me shows about Boston," thereby incorrectly recognizing "Austin" in the first speech as "Boston."

In some embodiments, the media guidance application retrieves, from a database, search results based on the first input. The database may include, for example, an information repository.

In some embodiments, the media guidance application generates for display the search results. For example, if the first input is "Show me shows about Boston," the media guidance application may retrieve and generate for display a listing for the television program Fringe, which takes place in Boston.

In some embodiments, the media guidance application determines a first time when the search results were generated for display. For example, the media guidance application may determine the first time by detecting the time when signals transmitted to pixels of a display screen first change subsequent to the first time.

In some embodiments, the media guidance application receives, via the user input device, subsequent to receiving the first speech, second speech. The second speech may include, for example, words spoken by the user. The second speech may be intended by the user to correct a portion of the first input that was incorrectly recognized by the media guidance application. For example, if the search results include a show about Boston, the user may determine that the media guidance application incorrectly generated "Show me shows about Boston" as the first input in response to the first speech ("Show me shows about Austin"). Accordingly, the second speech may be "Austin," where the user intends to correct "Boston" to "Austin."

In some embodiments, the media guidance application determines, using automatic speech recognition, a second input based on the second speech. For example, if the second speech is "Austin," the media guidance application may determine the second input to be "Austin," thereby correctly recognizing "Austin" in the second speech.

In some embodiments, the media guidance application determines a second time when the second speech was received. In some embodiments, the media guidance application may determine the second time by measuring, via the user input device, the time when the earliest pronunciation subsequent to the first time occurred.

In some embodiments, the media guidance application compares a time difference between the second time and the first time to a threshold time. For example, if the first time is 10:00:00 AM and the second time is 10:00:10 AM, the media guidance application may compute the time difference to be 10 seconds.

In some embodiments, based on comparing the time difference between the second time and the first time to the threshold time, the media guidance application determines that the time difference between the second time and the first time is less than the threshold time. For example, if the time difference is 10 seconds and the threshold time is 20 seconds, the media guidance application may determine that the time difference is less than the threshold time.

In some embodiments, based on determining that the time difference between the second time and the first time is less than the threshold time, the media guidance application generates a corrected input based on the first input by replacing a portion of the first input with a portion of the second input. For example, if the first input is "Show me shows about Boston," and the second input is "Austin," the media guidance application may replace "Boston" with "Austin" to generate the corrected input of "Show me shows about Austin."

In some embodiments, the media guidance application generates the corrected input further based on determining that no input associated with browsing search results was received via the user input device between the first time and the second time. For example, if the first input is "Show me shows about Boston," and the second input is "Austin," the media guidance application may replace "Boston" with "Austin" to generate the corrected input of "Show me shows about Austin" based on the time difference being less than the threshold time and no input associated with browsing search results being received. In some embodiments, determining that no input associated with browsing search results was received via the user input device between the first time and the second time includes determining that no input to scroll through the search results, read descriptions of the search results, open the search results, or play the search results was received via the user input device between the first time and the second time.

In some embodiments, the media guidance application captures, via the user input device, between the first time and the second time, an image of the face of a user. For example, if the user input device is a mobile phone, the mobile phone may capture the image of the face of the user using its camera. For example, the user may be viewing a media asset on a television, and the television may have an integrated camera and use the camera to capture the image of the face of the user. For example, the user may be viewing a media asset on a computer, and the computer may have an integrated camera and use the camera to capture the image of the face of the user.

In some embodiments, the media guidance application generates the corrected input further based on determining that the face of the user in the image is associated with a dissatisfied emotion. For example, to determine that the face of the user in the image is associated with a dissatisfied emotion, the media guidance application may analyze the image of the face of the user using facial recognition techniques to detect expressions such as anger and sadness. For example, if the first input is "Show me shows about Boston," and the second input is "Austin," the media guidance application may replace "Boston" with "Austin" to generate the corrected input of "Show me shows about Austin" based on the time difference being less than the threshold time and the face of the user in the image being associated with a dissatisfied emotion.

In some embodiments, the media guidance application captures, via the user input device, while the first speech is being received, a first image of the face of a user, and determines a first relative size of the face of the user in the first image. In some embodiments, the media guidance application captures, via the user input device, while the second speech is being received, a second image of the face of the user, and determines a second relative size of the face of the user in the second image. For example, if the user input device is a mobile phone, the mobile phone may capture the images of the face of the user using its camera. For example, the user may be viewing a media asset on a television, and the television may have an integrated camera and use the camera to capture the images of the face of the user. For example, the user may be viewing a media asset on a computer, and the computer may have an integrated camera and use the camera to capture the images of the face of the user. For example, the media guidance application may calculate the relative size of the face of the user in an image by counting the number of pixels occupied by the face of the user in the image.

In some embodiments, the media guidance application compares a relative size difference between the first relative size of the face of the user and the second relative size of the face of the user to a threshold relative size. For example, if the first relative size is 3 megapixels and the second relative size is 4 megapixels, the media guidance application may compute the relative size difference to be 1 megapixel.

In some embodiments, the media guidance application determines, based on comparing the relative size difference between the first relative size of the face of the user and the second relative size of the face of the user to the threshold relative size, that the relative size difference is greater than the threshold relative size. For example, if the relative size difference is 1 megapixel and the threshold relative size is 0.5 megapixel, the media guidance application may determine that the relative size difference is greater than the threshold relative size.

In some embodiments, the media guidance application generates the corrected input further based on determining that the relative size difference is greater than the threshold relative size. For example, if the first input is "Show me shows about Boston," and the second input is "Austin," the media guidance application may replace "Boston" with "Austin" to generate the corrected input of "Show me shows about Austin" based on the time difference being less than the threshold time and the relative size difference being greater than the threshold relative size.

In some embodiments, the media guidance application compares the time difference between the second time and the first time to another threshold time and, based on comparing the time difference between the second time and the first time to the other threshold time, determines that the time difference between the second time and the first time is greater than the other threshold time. For example, if the time difference is 10 seconds and the other threshold time is 2 seconds, the media guidance application may determine that the time difference is greater than the other threshold time. In some embodiments, the media guidance application generates the corrected input further based on determining that the time difference between the second time and the first time is greater than the other threshold time. For example, if the first input is "Show me shows about Boston," and the second input is "Austin," the media guidance application may replace "Boston" with "Austin" to generate the corrected input of "Show me shows about Austin" based on the time difference being less than the threshold time and the time difference being greater than the other threshold time.

In some embodiments, the media guidance application adjusts the threshold time based on an average time between inputs associated with a user. For example, the media guidance application may set the threshold time to a default value and adjust the threshold time based on the average time. For example, the media guidance application may adjust the threshold time by an amount associated with a range of average times. For example, the media guidance application may adjust the threshold time by an amount proportional to the average time.

In some embodiments, the media guidance application measures, via the user input device, a baseline environmental noise level. For example, to measure the baseline environmental noise level, the user input device may capture a baseline audio recording when the user is not speaking any input. For example, the media guidance application may measure the baseline environmental noise level as the average power in the baseline audio recording. In some embodiments, the media guidance application measures, via the user input device, an environmental noise level while the first speech is being received. For example, to measure the environmental noise level while the first speech is being received, the user input device may capture an audio recording when the first speech is being received, filter out vocals in the audio recording, and measure the average power of the remaining signal in this audio recording. In some embodiments, the media guidance application compares the environmental noise level difference between the environmental noise level while the first speech is being received and the baseline environmental noise level to a threshold environmental noise level. For example, if the environmental noise level difference in 0.1 mW and the threshold environmental noise level is 0.01 mW, the media guidance application may compare 0.1 mW to 0.01 mW. In some embodiments, based on comparing the environmental noise level difference between the environmental noise level while the first speech is being received and the baseline environmental noise level to the threshold environmental noise level, the media guidance application determines that the environmental noise level difference is greater than the threshold environmental noise level. For example, if the environmental noise level difference in 0.1 mW and the threshold environmental noise level is 0.01 mW, the media guidance application may determine that 0.1 mW is greater than 0.01 mW. In some embodiments, the media guidance generates the corrected input further based on determining that the environmental noise level difference is greater than the threshold environmental noise level. For example, if the first input is "Show me shows about Boston," and the second input is "Austin," the media guidance application may replace "Boston" with "Austin" to generate the corrected input of "Show me shows about Austin" based on the time difference being less than the threshold time and the environmental noise level difference being greater than the threshold environmental noise level.

In some embodiments, the media guidance application determines the second time by measuring, via the user input device, a time when the earliest pronunciation subsequent to the first time occurred. For example, if the media guidance application generated for display the search results at 10:00:00 AM, and the next pronunciation from the user was "Austin," the media guidance application may measure that the initial "Au" sound in "Austin" occurred at 10:00:10 AM, and consider 10:00:10 AM to be the second time.

In some embodiments, the media guidance application determines the first time by detecting a time when signals transmitted to pixels of a display screen first change subsequent to the first time. For example, signals transmitted to pixels of the display screen may cause the display screen to change, for example, to display new items. For example, once the search results have been retrieved and are ready to be displayed on the display screen, the signals transmitted to the pixels of the display screen may change in order to display the search results. The initial time after the first speech has been received when the signals transmitted to the pixels of the display screen change may represent the search results being displayed. Therefore, the initial time after the first speech has been received when the signals transmitted to the pixels of the display screen change can be considered the first time.

In some aspects, a media guidance application corrects, based on speech, input generated using automatic speech recognition, in the absence of an explicit indication in the speech that a user intended to correct the input with the speech. Specifically, in some embodiments, a media guidance application receives, via a user input device, first speech. The first speech may include, for example, words spoken by a user. For example, the first speech may be "Show me shows about Austin."

In some embodiments, the media guidance application determines, using automatic speech recognition, a first input based on the first speech. For example, if the first speech is "Show me shows about Austin," the media guidance application may determine the first input to be "Show me shows about Boston," thereby incorrectly recognizing "Austin" in the first speech as "Boston."

In some embodiments, the media guidance application retrieves, from a database, search results based on the first input. The database may include, for example, an information repository.

In some embodiments, the media guidance application generates for display the search results. For example, if the first input is "Show me shows about Boston," the media guidance application may retrieve and generate for display a listing for the television program Fringe, which takes place in Boston.

In some embodiments, the media guidance application determines a first time when the search results were generated for display. For example, the media guidance application may determine the first time by detecting the time when signals transmitted to pixels of a display screen first change subsequent to the first time.

In some embodiments, the media guidance application measures, via the user input device, a first acceleration of the user input device at the first time. For example, if the user input device at the first time is approximately motionless, the first acceleration may be 0 m/s$^2$.

In some embodiments, the media guidance application receives, via the user input device, subsequent to receiving the first speech, second speech. The second speech may include, for example, words spoken by the user. The second speech may be intended by the user to correct a portion of the first input that was incorrectly recognized by the media guidance application. For example, if the search results include a show about Boston, the user may determine that the media guidance application incorrectly generated "Show me shows about Boston" as the first input in response to the first speech ("Show me shows about Austin"). Accordingly, the second speech may be "Austin," where the user intends to correct "Boston" to "Austin."

In some embodiments, the media guidance application determines, using automatic speech recognition, a second input based on the second speech. For example, if the second speech is "Austin," the media guidance application may determine the second input to be "Austin," thereby correctly recognizing "Austin" in the second speech.

In some embodiments, the media guidance application determines a second time when the second speech was received. In some embodiments, the media guidance application may determine the second time by measuring, via the user input device, the time when the earliest pronunciation subsequent to the first time occurred.

In some embodiments, the media guidance application measures, via the user input device, a second acceleration of the user input device between the first time and the second time. For example, if the user input device moved at a rate of 1 m/s between the first time and the second time, the second acceleration may be 1 m/s$^2$.

In some embodiments, the media guidance application determines a difference in acceleration between the second acceleration and the first acceleration. For example, if the first acceleration is 0 m/s$^2$ and the second acceleration is 1 m/s$^2$, the difference in acceleration may be 1 m/s$^2$.

In some embodiments, based on determining the difference in acceleration between the second acceleration and the first acceleration, the media guidance application compares the difference in acceleration to a threshold acceleration. For example, if the difference in acceleration is 1 m/s$^2$ and the threshold acceleration is 0.25 m/s$^2$, the media guidance application may compare 1 m/s$^2$ to 0.25 m/s$^2$.

In some embodiments, based on comparing the difference in acceleration to the threshold acceleration, the media guidance application determines that the difference in acceleration is greater than the threshold acceleration. For example, if the difference in acceleration is 1 m/s$^2$ and the threshold acceleration is 0.25 m/s$^2$, the media guidance application may determine that 1 m/s$^2$ is greater than 0.25 m/s$^2$.

In some embodiments, based on determining that the difference in acceleration is greater than the threshold acceleration, the media guidance application generates a corrected input based on the first input by replacing a portion of the first input with a portion of the second input. For example, if the first input is "Show me shows about Boston," and the second input is "Austin," the media guidance application may replace "Boston" with "Austin" to generate the corrected input of "Show me shows about Austin."

In some embodiments, the media guidance application generates the corrected input further based on determining that no input associated with browsing search results was received via the user input device between the first time and the second time. For example, if the first input is "Show me shows about Boston," and the second input is "Austin," the media guidance application may replace "Boston" with "Austin" to generate the corrected input of "Show me shows about Austin" based on the difference in acceleration being greater than the threshold acceleration and no input associated with browsing search results being received. In some embodiments, determining that no input associated with browsing search results was received via the user input device between the first time and the second time includes determining that no input to scroll through the search results, read descriptions of the search results, open the search results, or play the search results was received via the user input device between the first time and the second time.

In some embodiments, the media guidance application captures, via the user input device, between the first time and the second time, an image of the face of a user. For example, if the user input device is a mobile phone, the mobile phone may capture the image of the face of the user using its camera. For example, the user may be viewing a media asset on a television, and the television may have an integrated camera and use the camera to capture the image of the face of the user. For example, the user may be viewing a media asset on a computer, and the computer may have an integrated camera and use the camera to capture the image of the face of the user.

In some embodiments, the media guidance application generates the corrected input further based on determining that the face of the user in the image is associated with a dissatisfied emotion. For example, to determine that the face of the user in the image is associated with a dissatisfied emotion, the media guidance application may analyze the image of the face of the user using facial recognition techniques to detect expressions such as anger and sadness. For example, if the first input is "Show me shows about Boston," and the second input is "Austin," the media guidance application may replace "Boston" with "Austin" to generate the corrected input of "Show me shows about Austin" based on the difference in acceleration being greater than the threshold acceleration and the face of the user in the image being associated with a dissatisfied emotion.

In some embodiments, the media guidance application captures, via the user input device, while the first speech is being received, a first image of the face of a user, and determines a first relative size of the face of the user in the first image. In some embodiments, the media guidance application captures, via the user input device, while the second speech is being received, a second image of the face of the user, and determines a second relative size of the face of the user in the second image. For example, if the user input device is a mobile phone, the mobile phone may capture the images of the face of the user using its camera. For example, the user may be viewing a media asset on a television, and the television may have an integrated camera and use the camera to capture the images of the face of the user. For example, the user may be viewing a media asset on a computer, and the computer may have an integrated camera and use the camera to capture the images of the face of the user. For example, the media guidance application may calculate the relative size of the face of the user in an image by counting the number of pixels occupied by the face of the user in the image.

In some embodiments, the media guidance application compares a relative size difference between the first relative size of the face of the user and the second relative size of the face of the user to a threshold relative size. For example, if the first relative size is 3 megapixels and the second relative size is 4 megapixels, the media guidance application may compute the relative size difference to be 1 megapixel.

In some embodiments, the media guidance application determines, based on comparing the relative size difference between the first relative size of the face of the user and the second relative size of the face of the user to the threshold relative size, that the relative size difference is greater than the threshold relative size. For example, if the relative size difference is 1 megapixel and the threshold relative size is 0.5 megapixel, the media guidance application may determine that 1 megapixel is greater than 0.5 megapixel.

In some embodiments, the media guidance application generates the corrected input further based on determining that the relative size difference is greater than the threshold relative size. For example, if the first input is "Show me shows about Boston," and the second input is "Austin," the media guidance application may replace "Boston" with "Austin" to generate the corrected input of "Show me shows about Austin" based on the difference in acceleration being greater than the threshold acceleration and the relative size difference being greater than the threshold relative size.

In some embodiments, the media guidance application measures, via the user input device, a baseline environmental noise level. For example, to measure the baseline environmental noise level, the user input device may capture a baseline audio recording when the user is not speaking any input. For example, the media guidance application may measure the baseline environmental noise level as the average power in the baseline audio recording. In some embodiments, the media guidance application measures, via the user input device, an environmental noise level while the first speech is being received. For example, to measure the environmental noise level while the first speech is being received, the user input device may capture an audio recording when the first speech is being received, filter out vocals in the audio recording, and measure the average power of the remaining signal in this audio recording. In some embodiments, the media guidance application compares the environmental noise level difference between the environmental noise level while the first speech is being received and the baseline environmental noise level to a threshold environmental noise level. For example, if the environmental noise level difference in 0.1 mW and the threshold environmental noise level is 0.01 mW, the media guidance application may compare 0.1 mW to 0.01 mW. In some embodiments, based on comparing the environmental noise level difference between the environmental noise level while the first speech is being received and the baseline environmental noise level to the threshold environmental noise level, the media guidance application determines that the environmental noise level difference is greater than the threshold environmental noise level. For example, if the environmental noise level difference in 0.1 mW and the threshold environmental noise level is 0.01 mW, the media guidance application may determine that 0.1 mW is greater than 0.01 mW. In some embodiments, the media guidance generates the corrected input further based on determining that the environmental noise level difference is greater than the threshold environmental noise level. For example, if the first input is "Show me shows about Boston," and the second input is "Austin," the media guidance application may replace "Boston" with "Austin" to generate the corrected input of "Show me shows about Austin" based on the difference in acceleration being greater than the threshold acceleration and the environmental noise level difference being greater than the threshold environmental noise level.

In some embodiments, the media guidance application determines the second time by measuring, via the user input device, a time when the earliest pronunciation subsequent to the first time occurred. For example, if the media guidance application generated for display the search results at 10:00:00 AM, and the next pronunciation from the user was "Austin," the media guidance application may measure that the initial "Au" sound in "Austin" occurred at 10:00:10 AM, and consider 10:00:10 AM to be the second time.

In some embodiments, the media guidance application determines the first time by detecting a time when signals transmitted to pixels of a display screen first change subsequent to the first time. For example, signals transmitted to pixels of the display screen may cause the display screen to change, for example, to display new items. For example, once the search results have been retrieved and are ready to be displayed on the display screen, the signals transmitted to the pixels of the display screen may change in order to display the search results. The initial time after the first speech has been received when the signals transmitted to the pixels of the display screen change may represent the search results being displayed. Therefore, the initial time after the first speech has been received when the signals transmitted to the pixels of the display screen change can be considered the first time.

In some embodiments, the user input device is a mobile phone including an accelerometer. For example, the mobile phone may be a smartphone. In some embodiments, the user input device is a tablet.

In some embodiments, measuring the second acceleration includes measuring a maximum acceleration of the user input device between the first time and the second time. For example, if the acceleration of the user input device rises from 0 m/s$^2$ to a maximum of 0.75 m/s$^2$ between the first time and the second time, the second acceleration may be 0.75 m/s$^2$.

Conventional systems may correct, based on subsequent speech, input generated using automatic speech recognition, by detecting phrases such as "No" or "I meant" in the subsequent speech. These phrases can serve as explicit indications that the user intends to correct the input with the subsequent speech. In the absence of such phrases, determining whether the user intends to correct an input with subsequent speech, as opposed to starting a new search or filtering results from a previous search, can be difficult. The described systems and methods use other indications, besides phrases such as "No" or "I meant," to determine whether the user intends to correct an input with subsequent speech. For example, the time difference between presentation of results and subsequent speech, and the difference in acceleration of a user input device between presentation of results and subsequent speech, can be used to determine whether the user intends to correct an input with subsequent speech.

It should be noted the systems and/or methods described above may be applied to, or used in accordance with, other systems, methods and/or apparatuses described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 shows example pseudocode for a process for determining a relative size of a face in an image in accordance with some embodiments of the disclosure.

DETAILED DESCRIPTION OF THE DRAWINGS

Methods and systems are described for correcting, based on subsequent second speech, an error in an input generated from first speech using automatic speech recognition, without an explicit indication in the second speech that a user intended to correct the input with the second speech, include determining that a time difference between when search results in response to the input were displayed and when the second speech was received is less than a threshold time, and based on the determination, correcting the input based on the second speech. The methods and systems also include determining that a difference in acceleration of a user input device, used to input the first speech and second speech, between when the search results in response to the input were displayed and when the second speech was received is less than a threshold acceleration, and based on the determination, correcting the input based on the second speech.

For example, if a user speaks "Show me shows about Austin," and a media guidance application presents search results including shows about Boston (because it incorrectly recognized "Austin" as "Boston"), the user may quickly speak "Austin." The media guidance application may determine, based on how quickly the user spoke "Austin" after the search results were presented, that the user intended to correct the incorrectly recognized "Boston" by speaking "Austin." If there had not been a recognition error, the user may have taken longer to review the search results. As another example, if a user speaks "Show me shows about Austin" into a user input device (e.g., a mobile phone) and a media guidance application presents search results including shows about Boston (because it incorrectly recognized "Austin" as "Boston"), the user may speak "Austin" after bringing the user input device closer to his/her mouth, in an attempt to aid accurate speech recognition. The acceleration of the user input device upon being brought closer to the user's mouth can be used by the media guidance application to determine that the user intended to correct the incorrectly recognized "Boston" by speaking "Austin."

Figure 1:
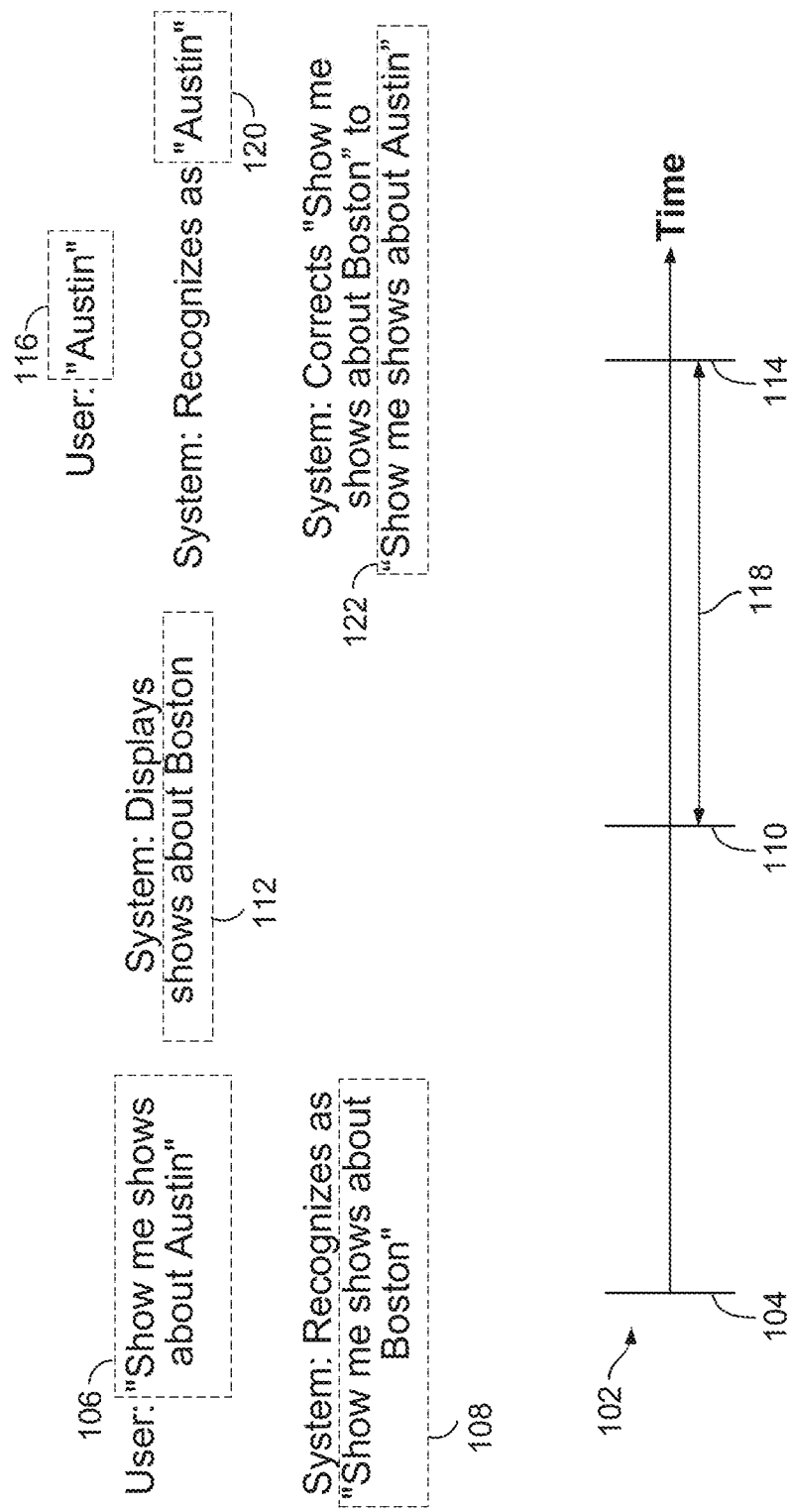
FIG. 1 shows an illustrative example of how a media guidance application can correct, based on subsequent second speech, an error in a first input generated from first speech using automatic speech recognition, in the absence of an explicit indication in the second speech that a user intended to correct the first input with the second speech in accordance with some embodiments of the disclosure.

FIG. 1 shows an illustrative example of how a media guidance application can correct, based on subsequent second speech 116, an error in a first input 108 generated from first speech 106 using automatic speech recognition, in the absence of an explicit indication in the second speech that a user intended to correct the first input 108 with the second speech 116. FIG. 1 includes a time axis 102 with three times, 104, 110, and 114, marked. At time 104, the user speaks first speech 106, which in the example of FIG. 1 is "Show me shows about Austin." The media guidance application may use automatic speech recognition to generate first input 108, which in the example of FIG. 1 is "Show me shows about Boston," based on first speech 106. Accordingly, in the example of FIG. 1, the media guidance application has incorrectly recognized "Austin" in first speech 106 as "Boston." At first time 110, the media guidance application responds to first input 108 by generating for display search results 112, which in the example of FIG. 1 are shows about Boston. At second time 114, the user speaks second speech 116, which in the example of FIG. 1 is "Austin." The media guidance application may use automatic speech recognition to generate second input 120, which in the example of FIG. 1 is "Austin," based on second speech 116. Accordingly, in the example of FIG. 1, the media guidance application has correctly recognized "Austin" in second speech 116. By speaking second speech 116, the user may be attempting to correct an error in first input 108 with second speech 116. In the example of FIG. 1, the user may be attempting to correct "Boston" in first input 108, which was generated incorrectly from first speech 106, with "Austin" of second speech 116. However, second speech 116 may lack an explicit indication whether the user intends to correct an error in first input 108 with second speech 116 or whether the user intends, for example, to begin a new search or filter the previously presented search results 112. For example, in FIG. 1, second speech 116 lacks phrases such as "No" or "I meant" which could represent explicit indications that the user intends to correct "Boston" with "Austin." To resolve this ambiguity, the media guidance application may calculate time difference 118 between second time 114, when the user spoke second speech 116 (in the example of FIG. 1, "Austin"), and first time 110, when the media guidance application generated for display search results 112 (in the example of FIG. 1, shows about Boston). The media guidance application may compare time difference 118 to a threshold time and, if time difference 118 is less than the threshold time, predict that the user intended to correct first input 108 with second speech 116. Accordingly, the media guidance application may generate corrected input 122 based on first input 108 by replacing a portion of first input 108 with a portion of second input 120. In FIG. 1, for example, the media guidance application may replace "Boston" in first input 108 with "Austin" from second input 120 to generate corrected input 122.

Calculating time difference 118 between second time 114, when the user spoke second speech 116 (in the example of FIG. 1, "Austin"), and first time 110, namely, the time when the media guidance application presented search results 112 (in the example of FIG. 1, shows about Boston), may be helpful because time difference 118 may indicate whether a user intended to correct an error in first input 108 with second speech 116 (in the example of FIG. 1, correct "Boston" with "Austin"). If there is not an error in first input 108, the user may take longer after search results 112 are generated for display at first time 110 to speak a subsequent input than if there is an error in first input 108. In the example of FIG. 1, if "Boston" was correctly recognized, the user may take a long amount of time (i.e., an amount of time greater than the threshold time) to scroll through search results 112, read descriptions of search results 112, open search results 112, play search results 112, etc. However, if "Boston" was incorrectly recognized, the user may notice in a short amount of time (i.e., an amount of time smaller than the threshold time) that search results 112 do not match what was requested in first speech 106, namely, shows about Austin. Accordingly, the user may not take a long amount of time to scroll through search results 112, read descriptions of search results 112, open search results 112, play search results 112, etc. Instead, the user may speak second speech 116 to correct the error in first input 108 very soon (i.e., an amount of time smaller than the threshold time) after seeing search results 112. Therefore, comparing time difference 118 to the threshold time can indicate whether the user intended to correct first input 108 with second speech 116.

Figure 2:
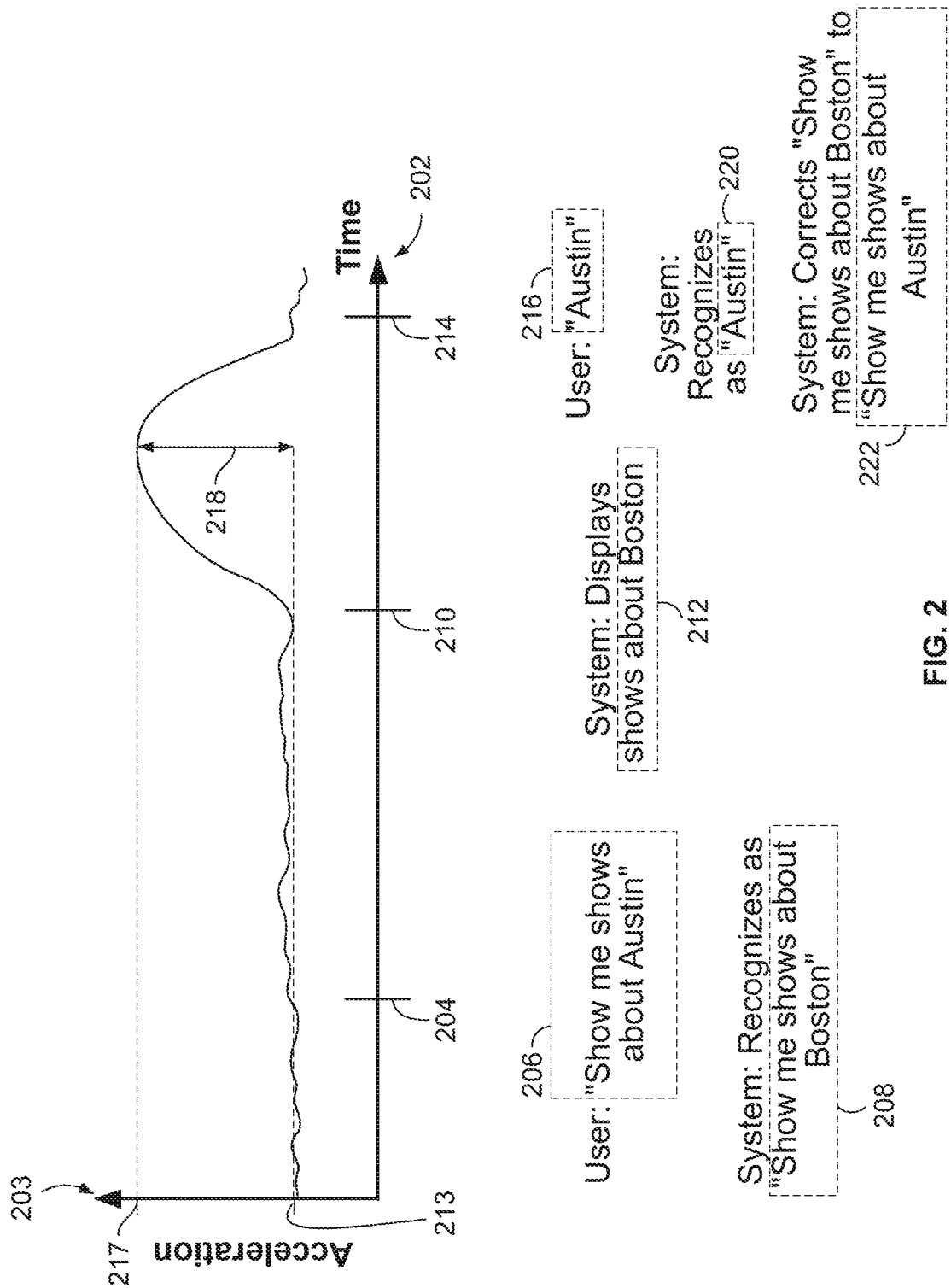
FIG. 2 shows an illustrative example of how a media guidance application can correct, based on subsequent second speech, an error in a first input generated from first speech using automatic speech recognition, in the absence of an explicit indication in the second speech that a user intended to correct the first input with the second speech in accordance with some embodiments of the disclosure.

FIG. 2 shows an illustrative example of how a media guidance application can correct, based on subsequent second speech 216, an error in a first input 208 generated from first speech 206 using automatic speech recognition, in the absence of an explicit indication in the second speech 216 that a user intended to correct the first input 208 with the second speech 216. FIG. 2 includes a time axis 202 with three times, 204, 210, and 214, marked. FIG. 2 also includes an acceleration axis 203 showing acceleration of a user input device receiving the user's speech, with two accelerations, first acceleration 213 and second acceleration 217, marked. The acceleration shown on acceleration axis 204 may be acceleration of the user input device in a single direction in three-dimensional space. At time 204, the user speaks first speech 206, which in the example of FIG. 2 is "Show me shows about Austin." The media guidance application may use automatic speech recognition to generate first input 208, which in the example of FIG. 2 is "Show me shows about Boston," based on first speech 206. Accordingly, in the example of FIG. 2, the media guidance application has incorrectly recognized "Austin" in first speech 206 as "Boston." At first time 210, the media guidance application responds to first input 208 by generating for display search results 212, which in the example of FIG. 2 are shows about Boston. At second time 214 the user speaks second speech 216, which in the example of FIG. 2 is "Austin." The media guidance application may use automatic speech recognition to generate second input 220, which in the example of FIG. 2 is "Austin," based on second speech 216. By speaking second speech 216, the user may be attempting to correct an error in first input 208 with second speech 216. In the example of FIG. 2, the user may be attempting to correct "Boston" in first input 208, which was generated incorrectly from first speech 206, with "Austin" of second speech 216. However, second speech 216 may lack an explicit indication whether the user intends to correct an error in first input 208 with second speech 216 or whether the user intends, for example, to begin a new search or filter the previously presented search results 212. For example, in FIG. 2, second speech 216 lacks phrases such as "No" or "I meant" which could represent explicit indications that the user intends to correct "Boston" with "Austin." To resolve this ambiguity, the media guidance application may calculate a difference in acceleration 218 of the user input device between second time 214, when the user spoke second speech 216 (in the example of FIG. 2, "Austin"), and first time 210, when the media guidance application generated for display search results 212 (in the example of FIG. 2, shows about Boston). For example, in FIG. 2, the media guidance application may calculate the difference in acceleration 218 between second acceleration 217 and first acceleration 213. The media guidance application may compare difference in acceleration 218 to a threshold acceleration and, if difference in acceleration 218 is greater than the threshold acceleration, predict that the user intended to correct first input 208 with second speech 216. Accordingly, the media guidance application may generate corrected input 222 based on first input 208 and second input 220 by replacing a portion of first input 208 with a portion of second input 220. In FIG. 2, for example, the media guidance application may replace "Boston" in first input 208 with "Austin" from second input 220 to generate corrected input 222.

Calculating difference in acceleration 218 of the user input device between second time 214, when the user spoke second speech 216 (in the example of FIG. 2, "Austin"), and first time 210, namely, the time when the media guidance application presented search results 212 (in the example of FIG. 2, shows about Boston), may be helpful because difference in acceleration 218 may indicate whether a user intended to correct an error in first input 208 with second speech 216 (in the example of FIG. 2, correct "Boston" with "Austin"). If there is an error in first input 208, as evidenced by search results 212 not matching what was requested in first speech 206, the user may bring the user input device closer to his/her mouth with the intention of enabling the user input device to more accurately detect second speech 216 and have a better chance of correctly recognizing second speech 216. Bringing the user input device closer to the user's mouth can be detected as a difference in acceleration of the user input device between first time 210 and second time 214 that exceeds a threshold acceleration. Therefore, comparing difference in acceleration 218 to the threshold acceleration can indicate whether the user intended to correct first input 208 with second speech 216.

The following description will describe in more detail how a media guidance application can correct, based on subsequent second speech, an error in a first input generated from first speech using automatic speech recognition, in the absence of an explicit indication in the second speech that a user intended to correct the first input with the second speech.

In some embodiments, the media guidance application may generate corrected input based on determining a difference in time. In some embodiments, the media guidance application may receive, via a user input device (e.g., user input interface 510, wireless user communications device 606), first speech 106. First speech 106 may include, for example, words spoken by a user. First speech 106 may be intended by the user to initiate a search for items, such as media assets. For example, first speech 106 may be "Show me shows about Austin."

In some embodiments, the media guidance application may determine, using automatic speech recognition, first input 108 based on first speech 106. For example, the media guidance application may determine first input 108 by converting first speech 106 to text using known automatic speech recognition techniques, such as those described in Gaikwad, Santosh K., Bharti W. Gawali, and Pravin Yannawar. "A review on speech recognition technique." *International Journal of Computer Applications* 10.3 (2010): 16-24, the disclosure of which is incorporated by reference herein in its entirety. For example, if first speech 106 is "Show me shows about Austin," the media guidance application may determine first input 108 to be "Show me shows about Boston," thereby incorrectly recognizing "Austin" in first speech 106 as "Boston."

In some embodiments, the media guidance application may retrieve, from a database (e.g., by retrieving the database from media content source 616 or media guidance data source 618 through communications network 614, or from storage 508), search results 112 based on first input 108. The database may include, for example, an information repository. To retrieve search results 112 from the information repository, the media guidance application may use known information retrieval techniques, such as those described in U.S. Pat. No. 8,577,671, the disclosure of which is incorporated by reference herein in its entirety. In some embodiments, search results 112 may include only one search result.

In some embodiments, the media guidance application may generate for display (e.g., on display 512) search results 112. For example, if first input 108 is "Show me shows about Boston," the media guidance application may retrieve and generate for display a listing (e.g., listings 308, 406, 408, 410, or 412) for the television program Fringe, which takes place in Boston.

In some embodiments, the media guidance application may determine first time 110 when search results 112 were generated for display. In some embodiments, the media guidance application may determine first time 110 by detecting the time when signals transmitted (e.g., from processing circuitry 506) to pixels of a display screen (e.g., display 512) first change subsequent to first time 110. In some embodiments, signals transmitted to pixels of the display screen cause the display screen to change, for example, to display new items. For example, when first speech 106 is received, the signals transmitted to pixels of the display screen may not change because no results have yet been retrieved. However, once search results 112 have been retrieved and are ready to be displayed on the display screen, the signals transmitted to the pixels of the display screen may change in order to display search results 112. The initial time after first speech 106 has been received when the signals transmitted to the pixels of the display screen change may represent search results 112 being displayed. Therefore, the initial time after first speech 106 has been received when the signals transmitted to the pixels of the display screen change can be considered first time 110 when search results 112 have been generated for display. In some embodiments, the media guidance application may ignore changes in signals transmitted to the pixels of the display screen that represent changes in the display of items such as a clock, cursor, and other items not associated with search results 112, when determining first time 110.

In some embodiments, the media guidance application may receive, via the user input device, subsequent to receiving first speech 106, second speech 116. Second speech 116 may include, for example, words spoken by a user. Second speech 116 may be intended by the user to correct a portion of first input 108 that was incorrectly recognized by the media guidance application. For example, the user may determine, based on search results 112 not matching first speech 106, that the media guidance incorrectly recognized a portion of first speech 106. For example, if the search results 112 include a show about Boston, the user may determine that the media guidance application incorrectly generated "Show me shows about Boston" as first input 108 in response to first speech 106 ("Show me shows about Austin"). Accordingly, second speech 116 may be "Austin," where the user intends to correct "Boston" to "Austin."

Second speech 116 may lack an explicit indication whether the user intends to correct an error in first input 108 with second speech 116, or whether the user intends, for example, to begin a new search or filter the previously presented search results 112 with second speech 116. For example, second speech 116 may lack phrases such as "No" or "I meant" which could represent explicit indications that the user intends to correct first input 108.

In some embodiments, the media guidance application may determine, using automatic speech recognition, second input 120, based on second speech 116. For example, the media guidance application may determine second input 120 by converting second speech 116 to text using known automatic speech recognition techniques, such as those described in Gaikwad, Santosh K., Bharti W. Gawali, and Pravin Yannawar. "A review on speech recognition technique." *International Journal of Computer Applications* 10.3 (2010): 16-24. For example, if second speech 116 is "Austin," the media guidance application may determine second input 120 to be "Austin," thereby correctly recognizing "Austin" in second speech 116.

In some embodiments, the media guidance application may determine second time 114 when second speech 116 was received. In some embodiments, the media guidance application may determine second time 114 by measuring, via the user input device, the time when the earliest pronunciation subsequent to first time 110 occurred. For example, if the media guidance application presented search results 112 at 10:00:00 AM, and the next pronunciation from the user was "Austin," the media guidance application may measure that the initial "Au" sound in "Austin" occurred at 10:00:10 AM, and consider 10:00:10 AM to be second time 114. In some embodiments, the media guidance application may detect the earliest pronunciation by detecting when the volume of input at the user input device exceeds a threshold volume for the first time subsequent to first time 110.

In some embodiments, the media guidance application may compare time difference 118 between second time 114 and first time 110 to a threshold time. The media guidance application may compute time difference 118 by subtracting first time 110 from second time 114. For example, if first time 110 is 10:00:00 AM and second time 114 is 10:00:10 AM, the media guidance application may compute time difference 118 to be 10 seconds. In computing time difference 118, the media guidance application may round first time 110, second time 114, and/or time difference 118 to the nearest second, minute, hour, etc. In some embodiments, the media guidance application may set the threshold time to be a default value or set the threshold time to be a user-defined value.

In some embodiments, based on comparing time difference 118 to the threshold time, the media guidance application may determine that time difference 118 is less than the threshold time. For example, if time difference 118 is 10 seconds and the threshold time is 20 seconds, the media guidance application may determine that time difference 118 is less than the threshold time.

In some embodiments, based on determining that time difference 118 is less than the threshold time, the media guidance application may generate corrected input 122 based on first input 108 by replacing a portion of first input 108 with a portion of second input 120. In some embodiments, the media guidance application may generate corrected input 122 based on first input 108 by replacing a portion of first input 108 with the entire second input 120. For example, if first input 108 is "Show me shows about Boston," and second input 120 is "Austin," the media guidance application may replace "Boston" with "Austin" to generate corrected input 122 of "Show me shows about Austin." The media guidance application may use any known method for replacing a portion of first input 108 with a portion of second input 120, such as those described in U.S. Patent App. Pub. No. 2014/0337370, U.S. Pat. No. 9,514,743, and U.S. Patent App. Pub. No. 2009/0228273, the contents of each of which are incorporated by reference herein in their entireties.

Calculating time difference 118 between second time 114, when the user spoke second speech 116, and first time 110, when the media guidance application generated for display the search results 112 for first input 108, may be helpful because time difference 118 may indicate whether the user intended to correct an error in first input 108 with second speech 116. If first speech 106 was correctly recognized in generating first input 108, the user may take longer after search results 112 are generated for display to speak a subsequent input than if a portion of first speech 106 was incorrectly recognized. For example, if first speech 106 was correctly recognized, the user may take a long amount of time (i.e., an amount of time greater than the threshold time) to scroll through search results 112, read descriptions of search results 112, open search results 112, play search results 112, etc. However, if a portion of first speech 106 was incorrectly recognized, the user may notice in a short amount of time (i.e., an amount of time smaller than the threshold time) that the search results 112 do not match what was requested in first speech 106. Accordingly, the user may not take a long amount of time to scroll through search results 112, read descriptions of search results 112, open search results 112, play search results 112, etc. Instead, the user may speak second speech 116 to correct the incorrectly recognized first speech 106 very soon (i.e., an amount of time smaller than the threshold time) after seeing search results 112.

In some embodiments, the media guidance application may adjust the threshold time based on the average time between inputs associated with a user. In some embodiments, the media guidance application may monitor the average time between spoken inputs entered by the user and store this average time in user history associated with the user. In some embodiments, the media guidance application may set the threshold time to a default value and adjust the threshold time based on the average time stored in the user history. In some embodiments, the media guidance application may adjust the threshold time by an amount associated with a range of average times. For example, if the average time is between 1 second and 5 seconds, the media guidance application may increase the threshold time by 5 seconds, while if the average time is between 5 seconds and 10 seconds, the media guidance application may increase the threshold time by 10 seconds. In some embodiments, the media guidance application may adjust the threshold time by an amount proportional to the average time. For example, the media guidance application may increase the threshold time by an amount of time equal to the average time. In some embodiments, the media guidance application may adjust the threshold time by a positive or negative amount of time. Adjusting the threshold time based on the average time between inputs associated with the user may be helpful in predicting how long a user may generally spend on reviewing search results 112. If the user's average time between inputs is large, then the user may spend a long time reviewing search results 112, and hence it may be warranted to increase the threshold time when predicting whether the user intended to correct first input 108 with second speech 116.

In some embodiments, the threshold time may be chosen based on network speed, for example, the speed with which the media guidance application responds to queries. In some embodiments, a standardized query (a "ping query") may be submitted and the response time measured in order to measure network speed and determine the threshold time.

In some embodiments, the media guidance application may generate corrected input 122 based on determining that no input associated with browsing search results 112 was received via a user input device between first time 110 and second time 114. For example, inputs associated with browsing search results 112 may include inputs to scroll up or down through displayed search results 112, inputs to open search results 112, inputs to play search results 112, and inputs to read descriptions of search results 112. The media guidance application may monitor inputs received via the user input device between first time 110 and second time 114 and determine that none of the types of the received inputs is associated with browsing search results 112.

Determining that no input associated with browsing search results 112 was received via the user input device between second time 114, when the user spoke second speech 116, and first time 110, when the media guidance application generated for display search results 112 for first input 108, may be helpful because this determination may indicate whether the user intended to correct an error in first input 108 with second speech 116. If first speech 106 was correctly recognized in generating first input 108, the user may enter inputs associated with browsing search results 112 after search results 112 are presented. For example, if first speech 106 was correctly recognized, the user may scroll through search results 112, read descriptions of search results 112, open search results 112. play search results 112, etc. However, if a portion of first speech 106 was incorrectly recognized, the user may notice that search results 112 do not match what was requested in first speech 106. Accordingly, the user may not scroll through search results 112, read descriptions of search results 112, open search results 112, play search results 112, etc. Instead, the user may speak second speech 116 to correct the incorrectly recognized first speech 106 after seeing search results 112 without entering any inputs via the user input device associated with browsing search results 112.

In some embodiments, the media guidance application may capture, via the user input device, between first time 110 and second time 114, an image of the face of a user. In some embodiments, the user input device may capture the image of the face of the user using a camera included in the user input device. For example, if the user input device is a mobile phone, the mobile phone may capture the image of the face of the user using its camera. In some embodiments, the user may be viewing a media asset on a television, and the television may have an integrated camera and use the camera to capture the image of the face of the user. In some embodiments, the user may be viewing a media asset on a computer, and the computer may have an integrated camera and use the camera to capture the image of the face of the user. In some embodiments, the media guidance application may generate corrected input 122 based on determining that the face of the user in the image is associated with a dissatisfied emotion. In some embodiments, to determine that the face of the user in the image is associated with a dissatisfied emotion, the media guidance application may analyze the image of the face of the user using facial recognition techniques to detect expressions such as anger and sadness. The media guidance application may use any method of detecting expressions in images of faces, such as the methods in Kulkarni, Saket S., Narender P. Reddy, and S. I. Hariharan. "Facial expression (mood) recognition from facial images using committee neural networks." *Biomedical Engineering Online* 8.1 (2009): 16, the content of which is incorporated by reference herein in its entirety. In some embodiments, the media guidance application may detect dissatisfied sounds, such as grumbling, in addition to/instead of detecting dissatisfied facial expressions.

Determining that the face of the user in the image is associated with a dissatisfied emotion may be helpful because this determination may indicate whether the user intended to correct an error in first input 108 with second speech 116. If first speech 106 was incorrectly recognized, and search results 112 presented do not match what the user intended, the user may be dissatisfied, and therefore the face of the user may exhibit a dissatisfied expression. If first speech 106 was correctly recognized, and search results 112 presented do match what the user intended, the user may be satisfied, and therefore the face of the user may not exhibit a dissatisfied expression.

In some embodiments, the media guidance application may capture, via the user input device, while first speech 106 is being received, a first image of the face of a user, and determine a first relative size of the face of the user in the first image. In some embodiments, the media guidance application may capture, via the user input device, while second speech 116 is being received, a second image of the face of the user, and determine a second relative size of the face of the user in the second image. In some embodiments, the user input device may capture the images of the face of the user using a camera included in the user input device. For example, if the user input device is a mobile phone, the mobile phone may capture the images of the face of the user using its camera. In some embodiments, the user may be viewing a media asset on a television, and the television may have an integrated camera and use the camera to capture the images of the face of the user. In some embodiments, the user may be viewing a media asset on a computer, and the computer may have an integrated camera and use the camera to capture the images of the face of the user. In some embodiments, the media guidance application may calculate the relative size of the face of the user in an image by counting the number of pixels occupied by the face of the user in the image. To determine the relative size of the face of the user in the first and second images, the media guidance application may use methods described with reference to FIGS. 9-10. In some embodiments, the media guidance application may compare a relative size difference between the first relative size of the face of the user and the second relative size of the face of the user to a threshold relative size. The media guidance application may compute the relative size difference by subtracting the first relative size from the second relative size. For example, if the first relative size is 3 megapixels and the second relative size is 4 megapixels, the media guidance application may compute the relative size difference to be 1 megapixel. In some embodiments, the media guidance application may determine, based on comparing the relative size difference to the threshold relative size, that the relative size difference is greater than the threshold relative size. For example, if the relative size difference is 1 megapixel and the threshold relative size is 0.5 megapixel, the media guidance application may determine that the relative size difference is greater than the threshold relative size. In some embodiments, the media guidance application may generate corrected input 122 based on determining that the relative size difference is greater than the threshold relative size.

Accordingly, the aforementioned method determines whether the relative size of the face of the user in an image taken while first speech 106 is received is smaller than the relative size of the face of the user in an image taken while second speech 116 is received. This may be helpful in determining whether the user intended to correct an error in first input 108 with second speech 116. If the user intended to correct an error in first input 108 with second speech 116, the user may attempt to bring his/her mouth closer to the user input device so the user input device can more accurately detect second speech 116 and have a better chance of correctly recognizing second speech 116. If the user brings his/her face closer to the user input device, this can be detected as an increase in the size of the face of the user in an image captured while second speech 116 is received versus the size of the face of the user in an image captured while first speech 106 is received.

In some embodiments, the media guidance application may compare time difference 118 between second time 114 and first time 110 to a second threshold time and, based on comparing time difference 118 to the second threshold time, determine that time difference 118 is greater than the second threshold time. In some embodiments, the media guidance application may generate corrected input 122 based on determining that time difference 118 is less than the threshold time and greater than the second threshold time. For example, if time difference 118 is 10 seconds, the threshold time is 20 seconds, and the second threshold time is 2 seconds, the media guidance application may determine that time difference 118 is less than the threshold time and greater than the second threshold time. The second threshold time may be less than the threshold time. Determining that time difference 118 is greater than the second threshold time may be helpful in avoiding generating corrected input 122 when the user is intending to continue first speech 106 with second speech 116. For example, first speech 106 may be "Show me shows about Austin," and the media guidance application may present a show about Austin (the town in Texas) as search results 112. Second speech 116 may be "Powers." In this example, second speech 116 may actually be a continuation of first speech 106, namely, the user intended to say "Show me shows about Austin Powers," (where Austin Powers is a character in a movie series). However, the media guidance application may have presented search results 112 before the user finished saying "Powers." In such a situation, the user is not intending to correct first speech 106 ("Show me shows about Austin") with second speech 116 ("Powers"). Rather, the user is intending to continue first speech 106 with second speech 116. Accordingly, the media guidance application may compare time difference 118 between second time 114 and first time 110 to a second threshold time which is smaller than the threshold time. If time difference 118 is less than or equal to the second threshold time, this may indicate that the user spoke second speech 116 very soon after search results 112 were presented, perhaps too soon after search results 112 were presented to even view search results 112. Accordingly, this may indicate that the user was not yet finished speaking first speech 106, and the media guidance application should not correct first speech 106 with second speech 116. However, if time difference 118 is greater than the second threshold time, but still less than the threshold time, this may indicate that the user spoke second speech 116 after a reasonable amount of time to briefly view search results 112 and determine that they do not match first speech 106. Accordingly, this may indicate that the user intended to correct first speech 106 with second speech 116.

In some embodiments, the media guidance application may measure, via the user input device, a baseline environmental noise level. In some embodiments, to measure the baseline environmental noise level, the user input device may capture a baseline audio recording when the user is not speaking any input. The media guidance application may determine an environmental noise level in this audio recording by measuring the average power in the baseline audio recording. In some embodiments, the media guidance application may measure, via the user input device, an environmental noise level while first speech 106 is being received. In some embodiments, to measure the environmental noise level while first speech 106 is being received, the user input device may capture an audio recording when first speech 106 is being received and filter out vocals in the audio recording using any known technique, such as those discussed in U.S. Patent App. Pub. No. 2005/0182504 and U.S. Patent App. Pub. No. 2008/0134866. The media guidance application may then measure the average power of the remaining signal in the audio recording to determine the environmental noise level in this audio recording. In some embodiments, the media guidance application may compare the environmental noise level difference between the environmental noise level while first speech 106 is being received and the baseline environmental noise level to a threshold environmental noise level. In some embodiments, based on comparing the environmental noise level difference between the environmental noise level while first speech 106 is being received and the baseline environmental noise level to the threshold environmental noise level, the media guidance application may determine that the environmental noise level difference is greater than the threshold environmental noise level. For example, if the environmental noise level difference is 0.1 mW and the threshold environmental noise level is 0.01 mW, the media guidance application may determine that 0.1 mW is greater than 0.01 mW. In some embodiments, the media guidance may generate corrected input 122 based on determining that the environmental noise level difference is greater than the threshold environmental noise level.

Determining that the environment noise level when first speech 106 is received is a threshold environmental noise level greater than a baseline environmental noise level may be helpful in determining whether the user intended to correct an error in first input 108 with second speech 116. For example, if the environment noise level when first speech 106 is received is large, then there may be a greater chance that first speech 106 was not correctly recognized due to the noise, and there may be a greater chance that the user intended to correct an error in first input 108 with second speech 116.

In some embodiments, the media guidance application may respond to first input 108 with a question to resolve an ambiguity. For example, if first input 108 is "Show me Sox games," the media guidance application may display search results 112 for both the Boston Red Sox and the Chicago White Sox (both sports teams). The media guidance application may also present to the user a disambiguating question, such as "Did you mean the Boston Red Sox or the Chicago White Sox?" The user may respond to this disambiguating question with second speech 116, such as "Boston Red Sox." In a case where the media guidance application presented a disambiguating question, the media guidance application may automatically consider, regardless of time difference 118 between first time 110 and second time 114, that second speech 116 should not be used to correct first input 108, but rather should be used to disambiguate it, or filter search results 112.

In some embodiments, the media guidance application may generate corrected input based on determining a difference in acceleration of a user input device. In some embodiments, the media guidance application may receive, via a user input device (e.g., user input interface 510 or wireless user communications device 606), first speech 206. The first speech 206 may include, for example, words spoken by a user. The first speech 206 may be intended by the user to initiate a search for items, such as media assets. For example, the first speech 206 may be "Show me shows about Austin."

In some embodiments, the media guidance application may determine, using automatic speech recognition, first input 208 based on first speech 206. For example, the media guidance application may determine first input 208 by converting first speech 206 to text using known automatic speech recognition techniques, such as those described in Gaikwad, Santosh K., Bharti W. Gawali, and Pravin Yannawar. "A review on speech recognition technique." *International Journal of Computer Applications* 10.3 (2010): 16-24, the disclosure of which is incorporated by reference herein in its entirety. For example, if first speech 206 is "Show me shows about Austin," the media guidance application may determine first input 208 to be "Show me shows about Boston," thereby incorrectly recognizing "Austin" in first speech 206 as "Boston."

In some embodiments, the media guidance application may retrieve, from a database (e.g., at media content source 616 or media guidance data source 618 through communications network 614, or at storage 508), search results 212 based on first input 208. The database may include, for example, an information repository. To retrieve search results 212 from the information repository, the media guidance application may use known information retrieval techniques, such as those described in U.S. Pat. No. 8,577,671, the disclosure of which is incorporated by reference herein in its entirety. In some embodiments, search results 212 may include only one search result.

In some embodiments, the media guidance application may generate for display (e.g., on display 512) search results 212. For example, if first input 208 is "Show me shows about Boston," the media guidance application may retrieve and generate for display a listing (e.g., listings 308, 406, 408, 410, or 412) for the television program Fringe, which takes place in Boston.

In some embodiments, the media guidance application may determine first time 210 when search results 212 were generated for display. In some embodiments, the media guidance application may determine first time 210 by detecting the time when signals transmitted to pixels of a display screen (e.g., display 512) first change subsequent to first time 210. In some embodiments, signals transmitted (e.g., from processing circuitry 506) to pixels of the display screen cause the display screen to change, for example, to display new items. For example, when first speech 206 is received, the signals transmitted to pixels of the display screen may not change because no results have yet been retrieved. However, once search results 212 have been retrieved and are ready to be displayed on the display screen, the signals transmitted to the pixels of the display screen may change in order to display search results 212. The initial time after first speech 206 has been received when the signals transmitted to the pixels of the display screen change may represent search results 212 being displayed. Therefore, the initial time after first speech 206 has been received when the signals transmitted to the pixels of the display screen change can be considered first time 210 when search results 212 have been generated for display. In some embodiments, the media guidance application may ignore changes in the signals transmitted to the pixels of the display screen that represent changes in the display of a clock, cursor, and other items not associated with search results 212, when determining first time 210.

In some embodiments, the media guidance application may measure, via the user input device, first acceleration 213 of the user input device at first time 210. In some embodiments, the user input device is a mobile phone (e.g., a smartphone), and the mobile phone may determine first acceleration 213 using an internal accelerometer. In some embodiments, the user input device is a tablet, and the tablet may determine first acceleration 213 using an internal accelerometer. In some embodiments, the media guidance application may measure first acceleration 213 via the user input device by measuring the acceleration of the user input device in one of the three spatial dimensions at first time 210. In some embodiments, the media guidance application may determine first acceleration 213 via the user input device as the maximum of the accelerations of the user input device in the three spatial dimensions at first time 210. In some embodiments, the media guidance application may determine first acceleration 213 via the user input device as the average of the accelerations of the user input device in the three spatial dimensions at first time 210. In some embodiments, the media guidance application may determine first acceleration 213 via the user input device as the square root of the sum of the squares of the accelerations of the user input device in the three spatial dimensions at first time 210.

In some embodiments, the media guidance application may receive, via the user input device, subsequent to receiving first speech 206, second speech 216. Second speech 216 may include, for example, words spoken by a user. Second speech 216 may be intended by the user to correct a portion of first input 208 that was incorrectly recognized by the media guidance application. For example, the user may determine, based on search results 212 not matching first speech 206, that the media guidance incorrectly recognized a portion of first speech 206. For example, if the search results 212 include a show about Boston, the user may determine that the media guidance application incorrectly generated "Show me shows about Boston" as first input 208 in response to first speech 206 ("Show me shows about Austin"). Accordingly, second speech 216 may be "Austin," where the user intends to correct "Boston" to "Austin." Second speech 216 may lack an explicit indication whether the user intends to correct an error in first input 208 with second speech 216, or whether the user intends, for example, to begin a new search or filter the previously presented search results 212 with second speech 216. For example, second speech 216 may lack phrases such as "No" or "I meant" which could represent explicit indications that the user intends to correct first input 208.

In some embodiments, the media guidance application may determine, using automatic speech recognition, second input 220 based on second speech 216. For example, the media guidance application may determine second input 220 by converting second speech 216 to text using known automatic speech recognition techniques, such as those described in Gaikwad, Santosh K., Bharti W. Gawali, and Pravin Yannawar. "A review on speech recognition technique." *International Journal of Computer Applications* 10.3 (2010): 16-24. For example, if second speech 216 is "Austin," the media guidance application may determine second input 220 to be "Austin," thereby correctly recognizing "Austin" in second speech 216.

In some embodiments, the media guidance application may determine second time 214 when second speech 216 was received. In some embodiments, the media guidance application may determine second time 214 by measuring, via the user input device, the time when the earliest pronunciation subsequent to first time 210 occurred. For example, if the media guidance application presented search results 212 at 10:00:00 AM, and the next pronunciation from the user was "Austin," the media guidance application may measure that the initial "Au" sound in "Austin" occurred at 10:00:10 AM, and consider 10:00:10 AM to be second time 214. In some embodiments, the media guidance application may detect the earliest pronunciation by detecting when the volume of input at the user input device exceeds a threshold volume for the first time subsequent to first time 210.

In some embodiments, the media guidance application may measure, via the user input device, second acceleration 217 of the user input device between first time 210 and second time 214. In some embodiments, the user input device is a mobile phone (e.g., a smartphone), and the mobile phone may determine second acceleration 217 using an internal accelerometer. In some embodiments, the user input device is a tablet, and the tablet may determine second acceleration 217 using an internal accelerometer. In some embodiments, the media guidance application may determine second acceleration 217 via the user input device by measuring the acceleration of the user input device in one of the three spatial dimensions between first time 210 and second time 214. In some embodiments, the media guidance application may determine second acceleration 217 via the user input device as the maximum of the accelerations of the user input device in the three spatial dimensions between first time 210 and second time 214. In some embodiments, the media guidance application may determine second acceleration 217 via the user input device as the average of the accelerations of the user input device in the three spatial dimensions between first time 210 and second time 214. In some embodiments, the media guidance application may determine second acceleration 217 via the user input device as the square root of the sum of the squares of the accelerations of the user input device in the three spatial dimensions between first time 210 and second time 214.

In some embodiments, the media guidance application may measure second acceleration 217 via the user input device by measuring the maximum acceleration of the user input device between first time 210 and second time 214.

In some embodiments, the media guidance application may measure second acceleration 217 via the user input device by measuring the average acceleration of the user input device between first time 210 and second time 214.

In some embodiments, the media guidance application may determine difference in acceleration 218 between second acceleration 217 and first acceleration 213. For example, if first acceleration 213 is 0 m/s$^2$ and second acceleration 217 is 1 m/s$^2$, the media guidance application may compute difference in acceleration 218 to be 1 m/s$^2$ seconds. The media guidance application may compute the difference in acceleration 218 by subtracting first acceleration 213 from second acceleration 217, and optionally taking the absolute value of the result. In computing difference in acceleration 218, the media guidance application may round first acceleration 213, second acceleration 217, and/or difference in acceleration 218 to a nearby value.

In some embodiments, based on determining difference in acceleration 218 between the second acceleration and the first acceleration, the media guidance application may compare difference in acceleration 218 to a threshold acceleration. For example, if difference in acceleration 218 is 1 m/s² and the threshold acceleration is 0.25 m/s², the media guidance application may compare 1 m/s² to 0.25 m/s². In some embodiments, the threshold acceleration may be determined as the average acceleration of a user input device when users bring the user input device closer to their mouths.

In some embodiments, based on comparing difference in acceleration 218 to the threshold acceleration, the media guidance application may determine that difference in acceleration 218 is greater than the threshold acceleration. For example, if difference in acceleration 218 is 1 m/s² and the threshold acceleration is 0.25 m/s², the media guidance application may determine that 1 m/s² is greater than 0.25 m/s².

In some embodiments, based on determining that difference in acceleration 218 is less than the threshold time, the media guidance application may generate corrected input 222 based on first input 208 by replacing a portion of first input 208 with a portion of second input 220. In some embodiments, the media guidance application may generate corrected input 222 based on first input 208 by replacing a portion of first input 208 with the entire second input 220. For example, if first input 208 is "Show me shows about Boston," and second input 220 is "Austin," the media guidance application may replace "Boston" with "Austin" to generate corrected input 222 of "Show me shows about Austin." The media guidance application may use any known method for replacing a portion of first input 208 with a portion of second input 220, such as those described in U.S. Patent App. Pub. No. 2014/0337370, U.S. Pat. No. 9,514,743, and U.S. Patent App. Pub. No. 2009/0228273, the contents of each of which are incorporated by reference herein in their entireties.

Calculating difference in acceleration 218 of the user input device between when search results 212 are presented and when the user speaks second speech 216 may be helpful because difference in acceleration 218 may indicate whether a user intended to correct an error in first input 208 with second speech 216. If there is an error in first input 208, the user may bring the user input device closer to his/her mouth with the intention of enabling the user input device to more accurately detect second speech 216 and have a better chance of correctly recognizing second speech 216. The motion of bringing the user input device closer to the user's mouth can be detected as a difference in acceleration of the user input device that exceeds a threshold acceleration.

In some embodiments, the media guidance application may generate corrected input 222 based on determining that no input associated with browsing search results 212 was received via a user input device between first time 210 and second time 214. For example, inputs associated with browsing search results 212 may include inputs to scroll up or down through displayed search results 212, inputs to open search results 212, inputs to play search results 212, and inputs to read descriptions of search results 212. The media guidance application may monitor inputs received via the user input device between first time 210 and second time 214 and determine that none of the types of the received inputs is associated with browsing search results 212.

Determining that no input associated with browsing search results 212 was received via the user input device between second time 214, when the user spoke second speech 216, and first time 210, when the media guidance application generated for display search results 212 for first input 208, may be helpful because this determination may indicate whether the user intended to correct an error in first input 208 with second speech 216. If first speech 206 was correctly recognized in generating first input 208, the user may enter inputs associated with browsing search results 212 after search results 212 are presented. For example, if first speech 206 was correctly recognized, the user may scroll through search results 212, read descriptions of search results 212, open search results 212, play search results 212, etc. However, if a portion of first speech 206 was incorrectly recognized, the user may notice that search results 212 do not match what was requested in first speech 206. Accordingly, the user may not scroll through search results 212, read descriptions of search results 212, open search results 212, play search results 212, etc. Instead, the user may speak second speech 216 to correct the incorrectly recognized first speech 206 after seeing search results 212 without entering any inputs via the user input device associated with browsing search results 212.

In some embodiments, the media guidance application may capture, via the user input device, between first time 210 and second time 214, an image of the face of a user. In some embodiments, the user input device may capture the image of the face of the user using a camera included in the user input device. For example, if the user input device is a mobile phone, the mobile phone may capture the image of the face of the user using its camera. In some embodiments, the user may be viewing a media asset on a television, and the television may have an integrated camera and use the camera to capture the image of the face of the user. In some embodiments, the user may be viewing a media asset on a computer, and the computer may have an integrated camera and use the camera to capture the image of the face of the user. In some embodiments, the media guidance application may generate corrected input 222 based on determining that the face of the user in the image is associated with a dissatisfied emotion. In some embodiments, to determine that the face of the user in the image is associated with a dissatisfied emotion, the media guidance application may analyze the image of the face of the user using facial recognition techniques to detect expressions such as anger and sadness. The media guidance application may use any method of detecting expressions in images of faces, such as the methods in Kulkarni, Saket S., Narender P. Reddy, and S. I. Hariharan. "Facial expression (mood) recognition from facial images using committee neural networks." *Biomedical engineering online* 8.1 (2009): 16, the content of which is incorporated by reference herein in its entirety. In some embodiments, the media guidance application may detect dissatisfied sounds, such as grumbling, in addition to/instead of detecting dissatisfied facial expressions.

Determining that the face of the user in the image is associated with a dissatisfied emotion may be helpful because this determination may indicate whether the user intended to correct an error in first input 208 with second speech 216. If first speech 206 was incorrectly recognized, and search results 212 presented do not match what the user intended, the user may be dissatisfied, and therefore the face of the user may exhibit a dissatisfied expression. If first speech 206 was correctly recognized, and search results 212 presented do match what the user intended, the user may be satisfied, and therefore the face of the user may not exhibit a dissatisfied expression.

In some embodiments, the media guidance application may capture, via the user input device, while first speech 206 is being received, a first image of the face of a user, and determine a first relative size of the face of the user in the first image. In some embodiments, the media guidance application may capture, via the user input device, while second speech 216 is being received, a second image of the face of the user, and determine a second relative size of the face of the user in the second image. In some embodiments, the user input device may capture the images of the face of the user using a camera included in the user input device. For example, if the user input device is a mobile phone, the mobile phone may capture the images of the face of the user using its camera. In some embodiments, the user may be viewing a media asset on a television, and the television may have an integrated camera and use the camera to capture the images of the face of the user. In some embodiments, the user may be viewing a media asset on a computer, and the computer may have an integrated camera and use the camera to capture the images of the face of the user. In some embodiments, the media guidance application may calculate the relative size of the face of the user in an image by counting the number of pixels occupied by the face of the user in the image. To determine the relative size of the face of the user in the first and second images, the media guidance application may use methods described with reference to FIGS. 9-10. In some embodiments, the media guidance application may compare a relative size difference between the first relative size of the face of the user and the second relative size of the face of the user to a threshold relative size. The media guidance application may compute the relative size difference by subtracting the first relative size from the second relative size. For example, if the first relative size is 3 megapixels and the second relative size is 4 megapixels, the media guidance application may compute the relative size difference to be 1 megapixel. In some embodiments, the media guidance application may determine, based on comparing the relative size difference to the threshold relative size, that the relative size difference is greater than the threshold relative size. For example, if the relative size difference is 1 megapixel and the threshold relative size is 0.5 megapixel, the media guidance application may determine that the relative size difference is greater than the threshold relative size. In some embodiments, the media guidance application may generate corrected input 222 based on determining that the relative size difference is greater than the threshold relative size.

Accordingly, the aforementioned method determines whether the relative size of the face of the user in an image taken while first speech 206 is received is smaller than the relative size of the face of the user in an image taken while second speech 216 is received. This may be helpful in determining whether the user intended to correct an error in first input 208 with second speech 216. If the user intended to correct an error in first input 208 with second speech 216, the user may attempt to bring his/her face closer to the user input device so the user input device can more accurately detect second speech 216 and have a better chance of correctly recognizing second speech 216. If the user brings his/her face closer to the user input device, this can be detected as an increase in the size of the face of the user in an image captured while second speech 216 is received versus the size of the face of the user in an image captured while first speech 206 is received.

In some embodiments, the media guidance application may measure, via the user input device, a baseline environmental noise level. In some embodiments, to measure the baseline environmental noise level, the user input device may capture a baseline audio recording when the user is not speaking any input. The media guidance application may determine environmental noise level in this audio recording by measuring the average power in the baseline audio recording. In some embodiments, the media guidance application may measure, via the user input device, an environmental noise level while first speech 206 is being received. In some embodiments, to measure the environmental noise level while first speech 206 is being received, the user input device may capture an audio recording when first speech 206 is being received and filter out vocals in the audio recording using any known technique, such as those discussed in U.S. Patent App. Pub. No. 2005/0182504 and U.S. Patent App. Pub. No. 2008/0134866. The media guidance application may then measure the average power of the remaining signal in the audio recording to determine the environmental noise level in this audio recording. In some embodiments, the media guidance application may compare the environmental noise level difference between the environmental noise level while first speech 206 is being received and the baseline environmental noise level to a threshold environmental noise level. In some embodiments, based on comparing the environmental noise level difference between the environmental noise level while first speech 106 is being received and the baseline environmental noise level to the threshold environmental noise level, the media guidance application may determine that the environmental noise level difference is greater than the threshold environmental noise level. For example, if the environmental noise level difference in 0.1 mW and the threshold environmental noise level is 0.01 mW, the media guidance application may determine that 0.1 mW is greater than 0.01 mW. In some embodiments, the media guidance may generate corrected input 222 based on determining that the environmental noise level difference is greater than the threshold environmental noise level.

Determining that the environment noise level when first speech 206 is received is a threshold environmental noise level greater than a baseline environmental noise level may be helpful in determining whether the user intended to correct an error in first input 208 with second speech 216. For example, if the environment noise level when first speech 206 is received is large, then there may be a greater chance that first speech 206 was not correctly recognized due to the noise, and there may be a greater chance that the user intended to correct an error in first input 208 with second speech 216.

As discussed above, the media guidance application may generate corrected input based on different conditions, including (1) the difference between the first time and the second time is less than a threshold; (2) no input associated with browsing search results is received between the first time and the second time; (3) the face of the user in an image captured between the first time and the second time is associated with a dissatisfied emotion; (4) the relative size of the face of the user in an image captured while the second speech is received is greater than the relative size of the face of the user in an image captured while the first speech is received; (5) the difference between the environmental noise level when the first speech is being received and the baseline environmental noise level is greater than a threshold environmental noise level; and (6) the difference between the first acceleration and the second acceleration is greater than a threshold acceleration.

In some embodiments, the media guidance application may use other conditions to determine whether to generate the corrected input. Because users may speak the second speech more slowly when correcting the first input, in some embodiments, the media guidance application may measure how long the user took to pronounce each word of the second speech and calculate the average pronunciation time of words in the second speech. In some embodiments, the media guidance application may generate the corrected input based on the average pronunciation time being greater than a threshold pronunciation time. In some embodiments, the media guidance application may calculate the average pronunciation time of words in the first speech and generate the corrected input based on the average pronunciation time of the second speech being greater than the average pronunciation time of words in the first speech.

Because users may speak second speech at a higher pitch when correcting the first input, in some embodiments, the media guidance application may measure the average energy level in the second speech. In some embodiments, the media guidance application may generate the corrected input based on the average energy level in the second speech being greater than a threshold energy level. In some embodiments, the media guidance application may measure the average energy level in the first speech and generate the corrected input based on the average pronunciation time based on the average pronunciation time of the second speech being greater than the average pronunciation time of words in the first speech. In some embodiments, the media guidance application may measure average energy levels by calculating the peak value of audio in the speech or calculating the root-mean-square value of audio in the speech.

In some embodiments, the media guidance application may generate the corrected input based on one of the above conditions being satisfied. For example, the media guidance application may generate the corrected input based on condition (1) being satisfied. For example, the media guidance application may generate the corrected input based on condition (6) being satisfied. In some embodiments, the media guidance application may generate the corrected input based on two of the above conditions being satisfied. For example, the media guidance application may generate the corrected input based on conditions (1) and (2) being satisfied, or conditions (1) and (3) being satisfied, or conditions (1) and (4) being satisfied, or conditions (1) and (5) being satisfied, or conditions (6) and (2) being satisfied, or conditions (6) and (3) being satisfied, or conditions (6) and (4) being satisfied, or conditions (6) and (5) being satisfied, or conditions (1) and (6) being satisfied. In some embodiments, the media guidance application may generate the corrected input based on more than two of the above conditions being satisfied. In some embodiments, the media guidance application may generate the corrected input based on one of two conditions being satisfied, or two of three conditions being satisfied, or any number of conditions from among any other number of conditions being satisfied.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
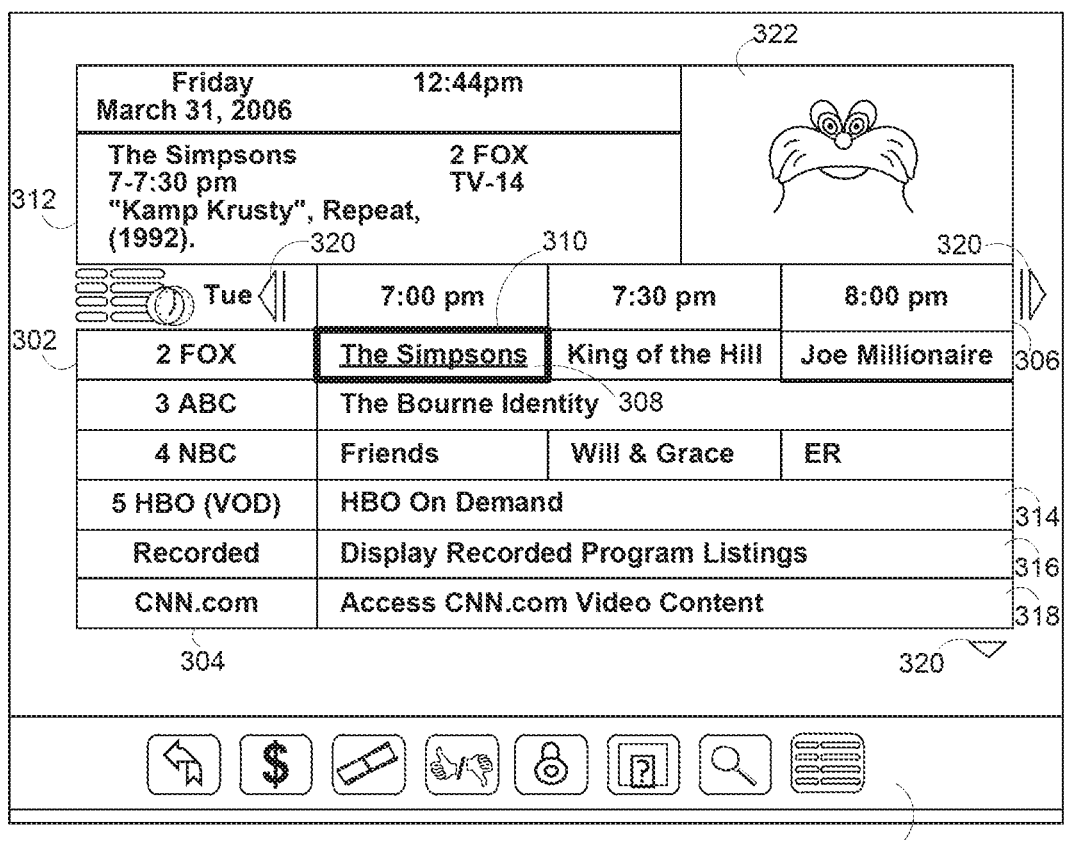
FIG. 3 shows an illustrative embodiment of a display screen that may be used to provide media guidance application listings and other media guidance information, in accordance with some embodiments of the disclosure.
Figure 4:
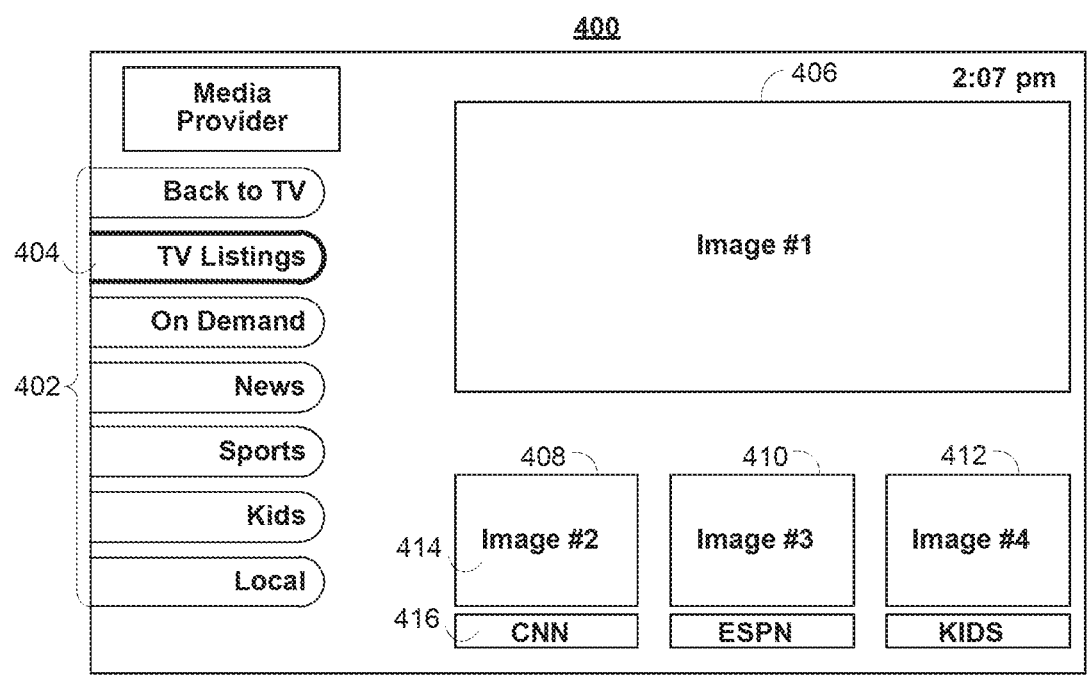
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc.

Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
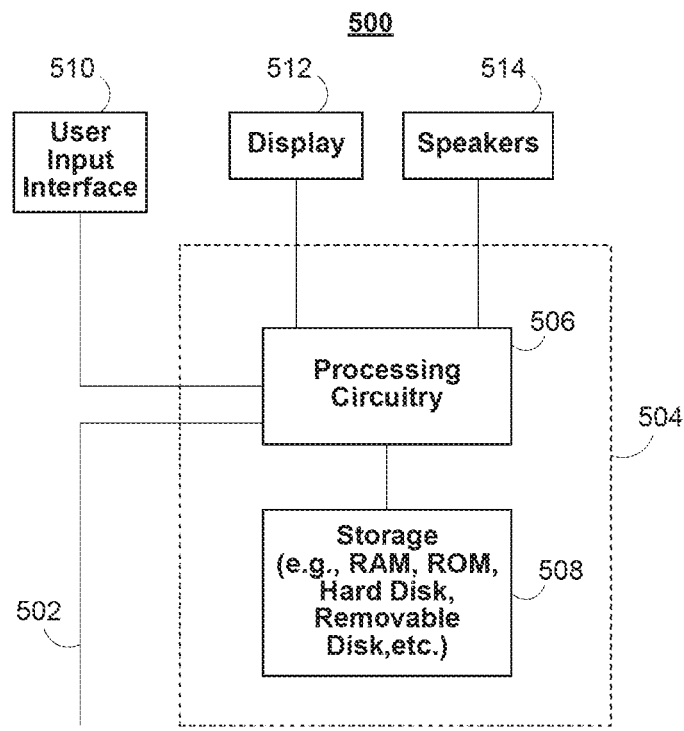
FIG. 5 shows a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
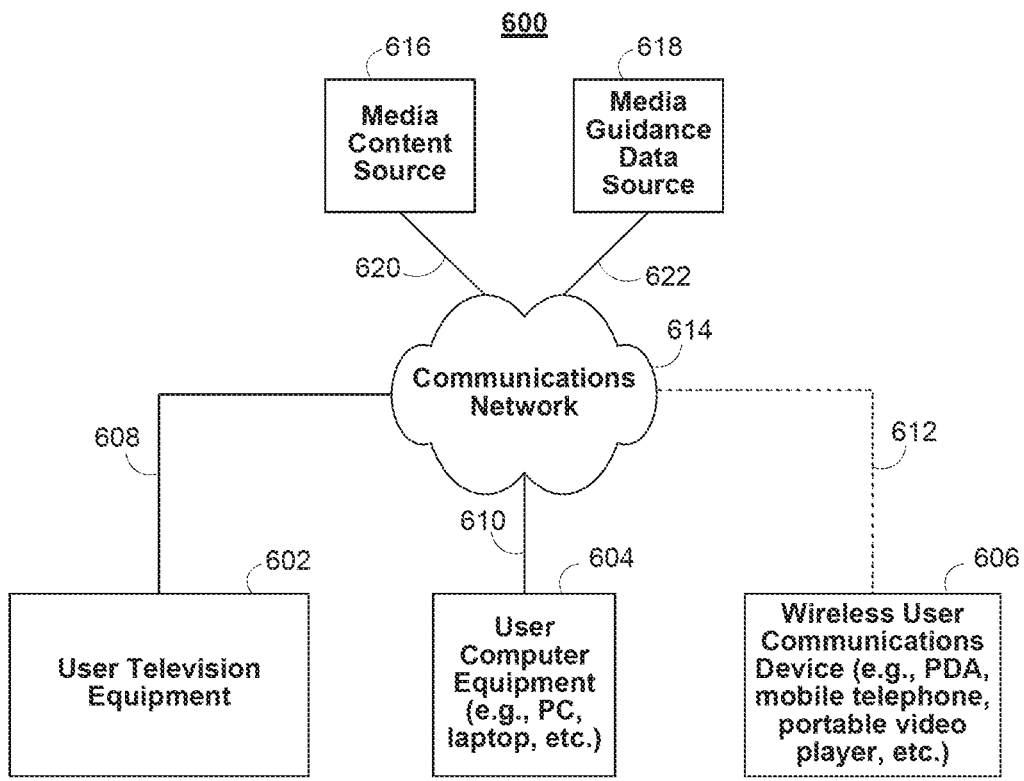
FIG. 6 shows a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively.

Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider.

Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
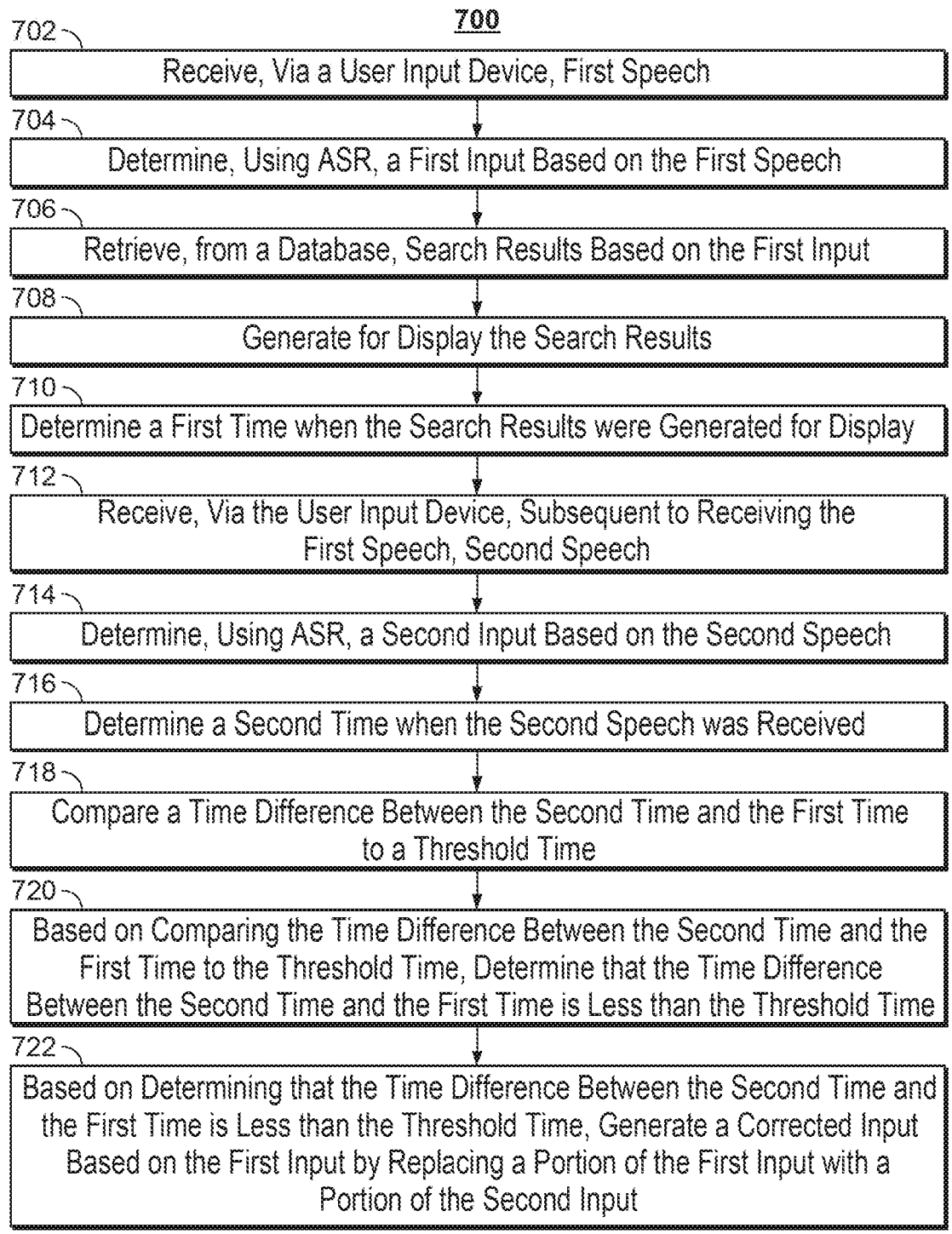
FIG. 7 depicts an illustrative flowchart of a process for correcting, based on subsequent second speech, an error in a first input generated from first speech using automatic speech recognition, in the absence of an explicit indication in the second speech that a user intended to correct the first input with the second speech, in accordance with some embodiments of the disclosure.

FIG. 7 depicts an illustrative flowchart of a process 700 for correcting, based on subsequent second speech, an error in a first input generated from first speech using automatic speech recognition, in the absence of an explicit indication in the second speech that a user intended to correct the first input with the second speech. A media guidance application causes control circuitry 504 of user equipment (e.g., user equipment 500, user television equipment 602, user computer equipment 604, or wireless user communications device 606) to execute each of the elements of FIG. 7. Process 700 begins at 702, where control circuitry 504 receives, via a user input device (e.g., user input interface 510, wireless communications device 606), first speech (e.g., first speech 106). The first speech may include, for example, words spoken by a user. The first speech may be intended by the user to initiate a search for items, such as media assets. For example, the first speech may be "Show me shows about Austin."

Process 700 continues to 704, where control circuitry 504 determines, using automatic speech recognition (ASR), a first input (e.g., first input 108), based on the first speech. For example, control circuitry 504 may determine the first input by converting the first speech to text using known automatic speech recognition techniques. For example, if the first speech is "Show me shows about Austin," control circuitry 504 may determine the first input to be "Show me shows about Boston," thereby incorrectly recognizing "Austin" in the first speech as
"Boston."

Process 700 continues to 706, where control circuitry 504 retrieves, from a database (e.g., from media content source 616 or media guidance data source 618 through communications network 614, or from storage 508) search results (e.g., search results 112) based on the first input. The database may include, for example, an information repository. For example, if the first input is "Show me shows about Boston," control circuitry 504 may retrieve the television program Fringe, which takes place in Boston.

Process 700 continues to 708, where control circuitry 504 generates for display (e.g., on display 512) the search results. For example, if the search results include the television show Fringe, control circuitry 504 may generate for display a listing (e.g., listings 308, 406, 408, 410, and 412) for Fringe.

Process 700 continues to 710, where control circuitry 504 determines a first time (e.g., first time 110) when the search results were generated for display. For example, control circuitry 504 may determine the first time by detecting the time when signals transmitted to pixels of a display screen (e.g., display 512) first changed subsequent to receiving first speech.

Process 700 continues to 712, where control circuitry 504 receives, via the user input device, subsequent to receiving the first speech, second speech (e.g., second speech 116). The second speech may include, for example, words spoken by a user. The second speech may be intended by the user to correct a portion of the first input that was incorrectly recognized by control circuitry 504. For example, the user may determine, based on the search results not matching the first speech, that the media guidance incorrectly recognized the first speech. For example, if the search results include a show about Boston, the user may determine that control circuitry 504 incorrectly generated "Show me shows about Boston" in response to the first speech ("Show me shows about Austin"). Accordingly, the second speech may be "Austin," where the user intends to correct "Boston" to "Austin."

Process 700 continues to 714, where control circuitry 504 determines, using automatic speech recognition (ASR), a second input (e.g., second input 120) based on the second speech. For example, control circuitry 504 may determine the second input by converting the second speech to text using known automatic speech recognition techniques. For example, if the second speech is "Austin," control circuitry 504 may determine the second input to be "Austin," thereby correctly recognizing "Austin" in the second speech.

Process 700 continues to 716, where control circuitry 504 determines a second time (e.g., second time 114) when the second speech was received. For example, control circuitry 504 may determine the second time by measuring the time when the earliest pronunciation subsequent to the first time occurred. For example, if control circuitry 504 generated for display the search results at 10:00:00 AM, and the next pronunciation from the user was "Austin," control circuitry 504 may measure that the initial "Au" sound in "Austin" occurred at 10:00:10 AM, and consider 10:00:10 AM to be the second time.

Process 700 continues to 718, where control circuitry 504 compares a time difference (e.g., time difference 118) between the second time and the first time to a threshold time. For example, if the first time is 10:00:00 AM and the second time is 10:00:10 AM, control circuitry 504 may compute the time difference to be 10 seconds and compare this time difference to a threshold time, which may be 20 seconds.

Process 700 continues to 720, where control circuitry 504, based on comparing the time difference between the second time and the first time to the threshold time, determines that the time difference between the second time and the first time is less than the threshold time. For example, if the time difference is 10 seconds and the threshold time is 20 seconds, control circuitry 504 may determine that 10 seconds is less than 20 seconds.

Process 700 continues to 722, where control circuitry 504, based on determining that the time difference between the second time and the first time is less than the threshold time, generates a corrected input (e.g., corrected input 122) based on the first input by replacing a portion of the first input with a portion of the second input. For example, if the first input is "Show me shows about Boston," and the second input is "Austin," control circuitry 504 may replace "Boston" with "Austin" to generate the corrected input of "Show me shows about Austin."

It should be noted that process 700 or any step thereof could be performed on, or provided by, any of the devices shown in FIGS. 4-5. For example, process 600 may be executed by control circuitry 504 (FIG. 5) as instructed by control circuitry implemented on user equipment 602, 604, 606 (FIG. 6), and/or user equipment 500 (FIG. 5), in order to correct, based on subsequent second speech, an error in a first input generated from first speech using automatic speech recognition, in the absence of an explicit indication in the second speech that a user intended to correct the first input with the second speech. In addition, process 700 may be incorporated into or combined with one or more steps of any other process or embodiment.

Figure 8:
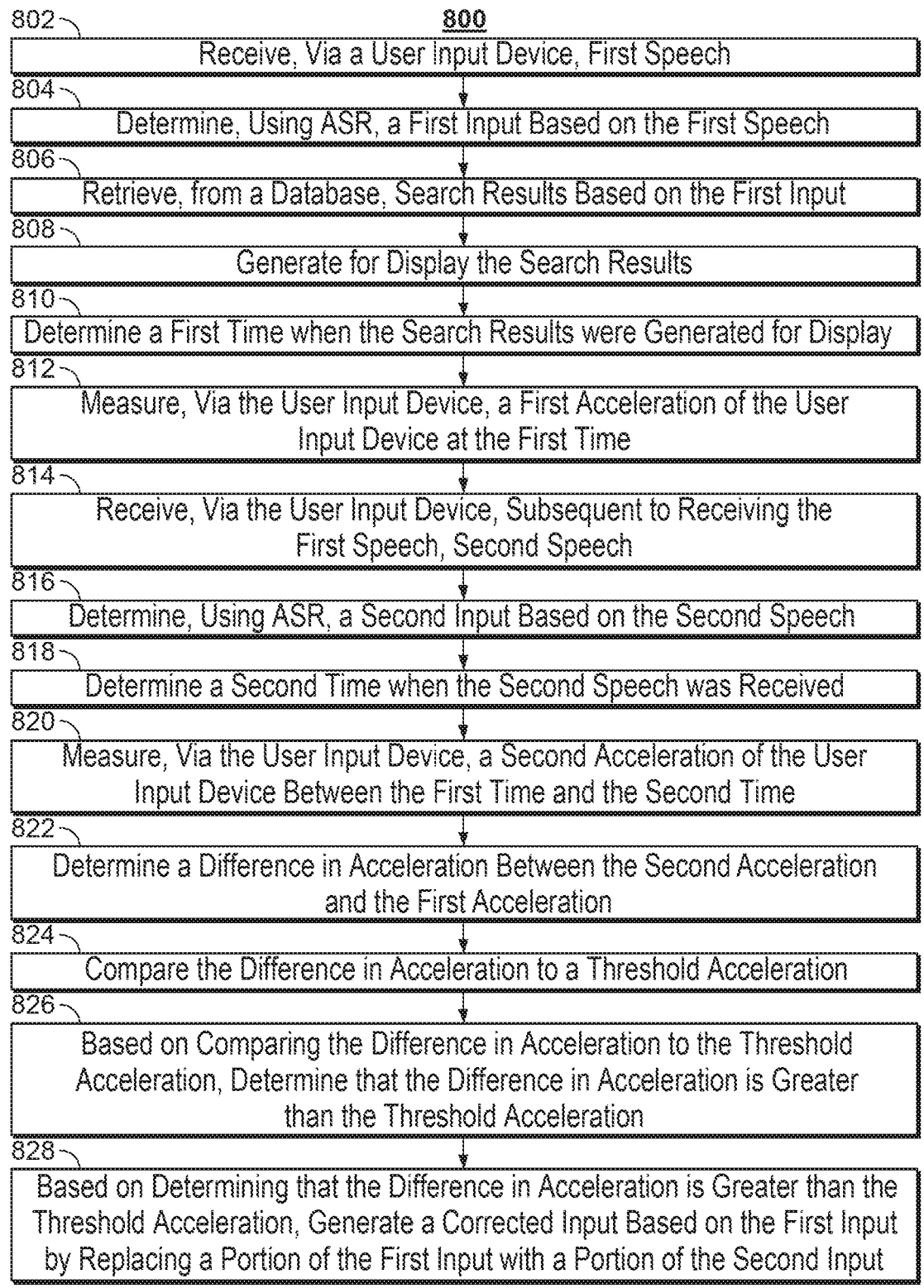
FIG. 8 depicts an illustrative flowchart of a process for correcting, based on subsequent second speech, an error in a first input generated from first speech using automatic speech recognition, in the absence of an explicit indication in the second speech that a user intended to correct the first input with the second speech, in accordance with some embodiments of the disclosure.

FIG. 8 depicts an illustrative flowchart of a process 800 for correcting, based on subsequent second speech, an error in a first input generated from first speech using automatic speech recognition, in the absence of an explicit indication in the second speech that a user intended to correct the first input with the second speech. A media guidance application causes control circuitry 504 of user equipment (e.g., user equipment 500, user television equipment 602, user computer equipment 604, or wireless user communications device 606) to execute each of the elements of FIG. 8. Process 800 begins at 802, where control circuitry 504 receives, via a user input device (e.g., user input interface 510, wireless communications device 606), first speech (e.g., first speech 206). The first speech may include, for example, words spoken by a user. The first speech may be intended by the user to initiate a search for items, such as media assets. For example, the first speech may be "Show me shows about Austin."

Process 800 continues to 804, where control circuitry 504 determines, using automatic speech recognition (ASR), a first input (e.g., first input 208) based on the first speech. For example, control circuitry 504 may determine the first input by converting the first speech to text using known automatic speech recognition techniques. For example, if the first speech is "Show me shows about Austin," control circuitry 504 may determine the first input to be "Show me shows about Boston," thereby incorrectly recognizing "Austin" in the first speech as "Boston."

Process 800 continues to 806, where control circuitry 504 retrieves, from a database (e.g., from media content source 616 or media guidance data source 618 through communications network 614, or from storage 508) search results (e.g., search results 212) based on the first input. The database may include, for example, an information repository. For example, if the first input is "Show me shows about Boston," control circuitry 504 may retrieve the television program Fringe, which takes place in Boston.

Process 800 continues to 808, where control circuitry 504 generates for display (e.g., on display 512) the search results. For example, if the search results include the television show Fringe, control circuitry 504 may generate for display a listing (e.g., listings 308, 406, 408, 410, and 412) for Fringe.

Process 800 continues to 810, where control circuitry 504 determines a first time (e.g., first time 210) when the search results were generated for display. For example, control circuitry 504 may determine the first time by detecting the time when signals transmitted to pixels of a display screen (e.g., display 512) first changed subsequent to receiving first speech.

Process 800 continues to 812, where control circuitry measures, via the user input device, a first acceleration (e.g., first acceleration 213) of the user input device at the first time. For example, if the user input device at the first time is approximately motionless, the first acceleration may be 0 m/s$^2$.

Process 800 continues to 814, where control circuitry 504 receives, via the user input device, subsequent to receiving the first speech, second speech (e.g., second speech 216). The second speech may include, for example, words spoken by a user. The second speech may be intended by the user to correct a portion of the first input that was incorrectly recognized by control circuitry 504. For example, the user may determine, based on the search results not matching the first speech, that the media guidance incorrectly recognized the first speech. For example, if the search results include a show about Boston, the user may determine that control circuitry 504 incorrectly generated "Show me shows about Boston" in response to the first speech ("Show me shows about Austin"). Accordingly, the second speech may be "Austin," where the user intends to correct "Boston" to "Austin."

Process 800 continues to 816, where control circuitry 504 determines, using automatic speech recognition (ASR), a second input (e.g., second input 720) based on the second speech. For example, control circuitry 504 may determine the second input by converting the second speech to text using known automatic speech recognition techniques. For example, if the second speech is "Austin," control circuitry 504 may determine the second input to be "Austin," thereby correctly recognizing "Austin" in the second speech.

Process 800 continues to 818, where control circuitry 504 determines a second time (e.g., second time 214) when the second speech was received. For example, control circuitry 504 may determine the second time by measuring the time when the earliest pronunciation subsequent to the first time occurred. For example, if control circuitry 504 generated for display the search results at 10:00:00 AM, and the next pronunciation from the user was "Austin," control circuitry 504 may measure that the initial "Au" sound in "Austin" occurred at 10:00:10 AM, and consider 10:00:10 AM to be the second time.

Process 800 continues to 820, where control circuitry measures, via the user input device, a second acceleration (e.g., second acceleration 217) of the user input device between the first time and the second time. For example, if the user input device moved at a rate of 1 m/s between the first time and the second time, the second acceleration may be 1 m/s².

Process 800 continues to 822, where control circuitry determines a difference in acceleration (e.g., difference in acceleration 218) between the second acceleration and the first acceleration. For example, if the first acceleration is 0 m/s² and the second acceleration is 1 m/s², the difference in acceleration may be 1 m/s².

Process 800 continues to 824, where control circuitry 504 compares the difference in acceleration to a threshold acceleration. For example, if the acceleration of the user input device at the first time is 0 m/s² and the acceleration of the device at the second time is 1 m/s², control circuitry may compute the difference in acceleration to be 1 m/s² seconds and compare this difference in acceleration to a threshold acceleration, which may be 0.25 m/s².

Process 800 continues to 826, where control circuitry 504, based on comparing the difference in acceleration to the threshold acceleration, determines that the difference in acceleration is greater than the threshold acceleration. For example, if the difference in acceleration is 1 m/s² and the threshold acceleration is 0.25 m/s², control circuitry 504 may determine that 1 m/s² is greater than 0.25 m/s².

Process 800 continues to 828, where control circuitry 504, based on determining that the difference in acceleration is greater than the threshold acceleration, generates a corrected input (e.g., corrected input 222) based on the first input by replacing a portion of the first input with a portion of the second input. For example, if the first input is "Show me shows about Boston," and the second input is "Austin," the media guidance application may replace "Boston" with "Austin" to generate a corrected input of "Show me shows about Austin."

It should be noted that process 800 or any step thereof could be performed on, or provided by, any of the devices shown in FIGS. 4-5. For example, process 800 may be executed by control circuitry 504 (FIG. 5) as instructed by control circuitry implemented on user equipment 602, 604, 606 (FIG. 6), and/or user equipment 500 (FIG. 5), in order to correct, based on subsequent second speech, an error in a first input generated from first speech using automatic speech recognition, in the absence of an explicit indication in the second speech that a user intended to correct the first input with the second speech. In addition, process 800 may be incorporated into or combined with one or more steps of any other process or embodiment. For example, if the first input is "Show me shows about Boston," and the second input is "Austin," control circuitry 504 may replace "Boston" with "Austin" to generate a corrected input of "Show me shows about Austin."

Figure 9:
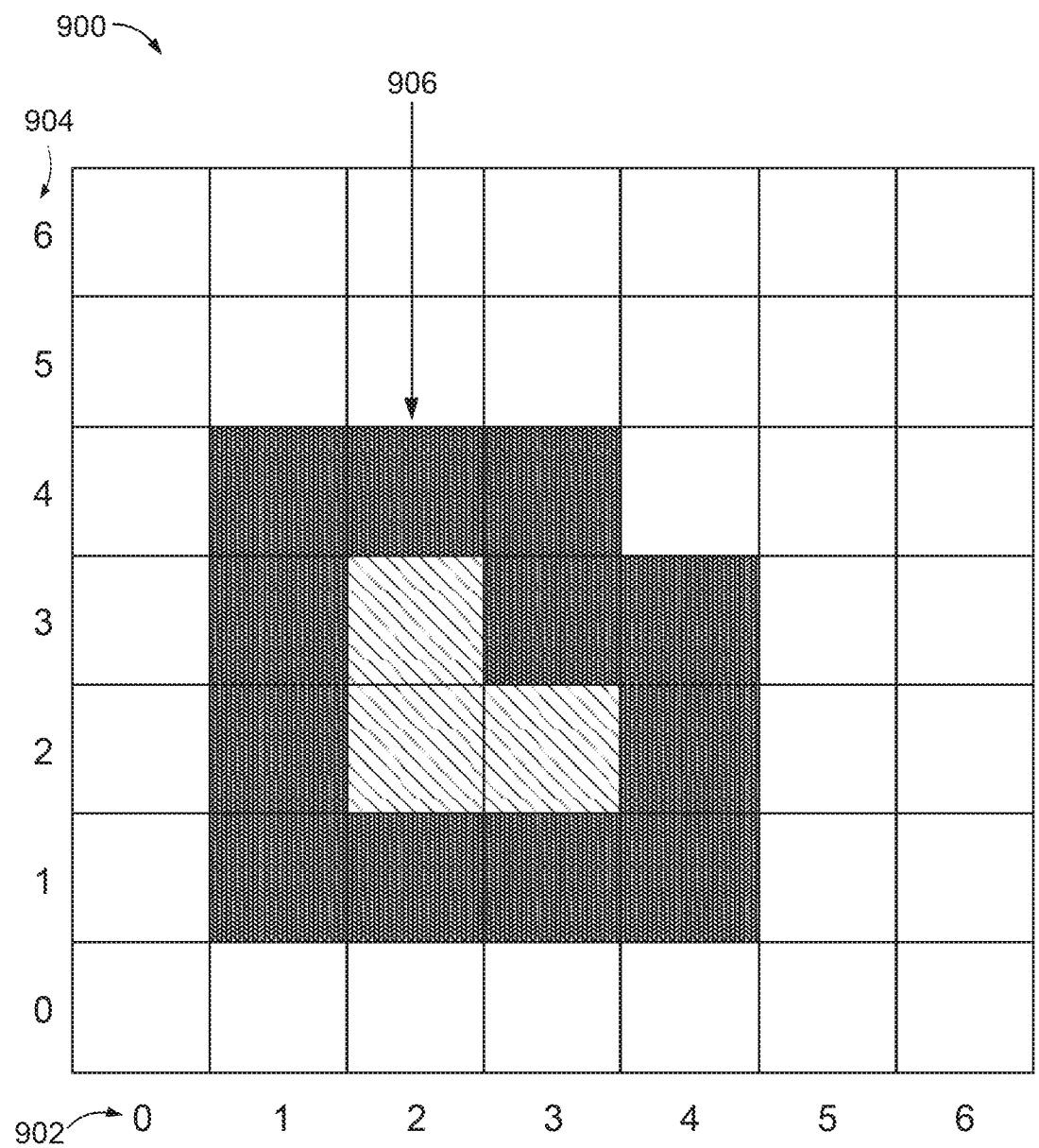
FIG. 9 shows an illustrative example of determining a relative size of a face in an image in accordance with some embodiments of the disclosure.

FIG. 9 shows an illustrative example of determining a relative size of a face in an image. FIG. 9 shows a display screen comprising a plurality of pixels 900. Each pixel is assigned an address, including a horizontal address based on horizontal index 902 and vertical index 904. For example, the pixel at the bottom right corner of the plurality of pixels 900 has address (6,0), where the first number of the pair represents the horizontal address and the second number of the pair represents the vertical address. Plurality of pixels 900 includes object 906. While object 906 is shown as a simple shape, the methods described herein apply equally if object 906 is a face. The edges of object 906 are determined using edge detection, pattern recognition, including, but not limited to, self-learning systems (e.g., neural networks), and/or any other suitable technique or method. If object 906 is a face, it may be detected using any face detection method, such as those described in Yang, Ming-Hsuan, David J. Kriegman, and Narendra Ahuj a. "Detecting faces in images: A survey." *IEEE Transactions on pattern analysis and machine intelligence* 24.1 (2002): 34-58, the contents of which are incorporated by reference herein in their entireties. The left edge of object 906 is determined to include pixels at addresses (1,1), (1,2), (1,3), and (1,4); the bottom edge is determined to include pixels at addresses (1,1), (2,1), (3,1); and (4,1), the right edge is determined to include pixels at addresses (4,1), (4,2), (4,3), (3,3), and (3,4); and the top edge is determined to include pixels at addresses (1,4), (2,4), (3,4), (3,3), and (4,3). Object 906 also includes pixels in the interior of the edges, i.e., pixels at addresses (2,2), (2,3), and (3,2). Accordingly, the subset of pixels of the plurality of pixels 900 in which object 906 occurs is (1,1), (1,2), (1,3), (1,4), (2,1), (2,2), (2,3), (2,4), (3,1), (3,2), (3,3), (3,4), (4,1), (4,2), and (4,3). The relative size of object 906 may be considered to be the number of pixels of the plurality of pixels 900 in which object 906 occurs. In the example of FIG. 9, the number of pixels of the plurality of pixels 900 in which object 906 occurs is 15.

FIG. 10 shows example pseudocode for a process for determining a relative size of a face in an image. The below discussion is directed to the simple object 906, but applies equally well if object 906 is a face. At line 1000, a matrix is initialized containing the addresses of pixels of the left edge of the object and stored as the variable left. Following the example of FIG. 9, left would contain (1,1), (1,2), (1,3), and (1,4). At line 1002, a matrix is initialized containing the addresses of pixels of the right edge of the object and stored as the variable right. Following the example of FIG. 9, right would contain (4,1), (4,2), (4,3), (3,3), and (3,4). At line 1004, a matrix is initialized containing left and right and stored as shape. Following the example of FIG. 9, shape would contain (1,1), (1,2), (1,3), (1,4), (4,1), (4,2), (4,3), (3,3), and (3,4). Lines 1006-1008 loop through each element of left and store the element as left_test. For example, the element (1,2) may be chosen. At lines 1010-1012, the horizontal and vertical components of left_test are stored as left_test_h and left_test_v, respectively. Following the above example, left_test_h would equal 1 and left_test_v would equal 2. At line 1014, an element in right having a vertical component matching left_test_v is found and stored as right_test. Line 1014 may be implemented as a loop through right. Following the above example, (4,2) may be chosen and stored as right_test. At line 1016, left_test_h is incremented by one. Following the above example, left_test_h would be incremented to 2. At lines 1018-1022, if the horizontal component of right_test is greater than left_test_h, then a pixel with address (left_test_h, left_test_v) is added to shape, and the process returns to line 1016. Following the above example, the horizontal component of right_test is 4 and left_test_h is 2, so (2,2) is added to shape and the process returns to line 1016. On a subsequent run through lines 16-22, (3,2) would be added to shape. On a subsequent run, the conditional statement in line 1018 would not be true, as left_test_h would be equal to the horizontal component of right_test, 4, so the process would proceed to line 1006, where another element of left, such as (1,3), is chosen. Once each element of left has been chosen at line 1006, the process proceeds to line 1032, where duplicates are removed from shape. This process, when repeated similarly for the top and bottom edges, would result in shape containing the subset of pixels of the plurality of pixels in which the object occurs. The number of elements of shape may then be considered the relative size of object 906.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for correcting, based on speech, input generated using automatic speech recognition, in the absence of an explicit indication in the speech that a user intended to correct the input with the speech, the method comprising:
   receiving, via a user input device, first speech;
   determining, using control circuitry and automatic speech recognition, a first input based on the first speech;
   retrieving, from a database, browsing search results based on the first input;
   generating for display, using the control circuitry, the browsing search results;
   determining, using the control circuitry, a first time when the browsing search results were generated for display;
   receiving, via the user input device, subsequent to receiving the first speech, second speech;
   determining, using the control circuitry and automatic speech recognition, a second input based on the second speech;
   determining, using the control circuitry, a second time when the second speech was received;
   calculating, using the control circuitry, a time difference between the second time and the first time;
   determining, using the control circuitry, whether the time difference between the second time and the first time is less than a threshold time;
   determining, using the control circuitry, that no input associated with the browsing search results was received via the user input device between the first time and the second time; and
   in response to determining that the time difference is less than the threshold time and determining that no input associated with the browsing search results was received via the user input device between the first time and the second time, generating, using the control circuitry, a corrected input based on the first input by replacing a portion of the first input with a portion of the second input.

2. The method of claim 1, wherein determining that no input associated with the browsing search results was received via the user input device between the first time and the second time comprises determining that no input to scroll through the browsing search results, read descriptions of the browsing search results, open the browsing search results, or play the browsing search results was received via the user input device between the first time and the second time.

3. The method of claim 1, further comprising:
   capturing, via the user input device, between the first time and the second time, an image of a face of a user; and
   wherein generating the corrected input is further based on determining, using the control circuitry, that the face of the user in the image is associated with a dissatisfied emotion.

4. The method of claim 1, further comprising:
   capturing, via the user input device, while the first speech is being received, a first image of a face of a user;
   determining, using the control circuitry, a first relative size of the face of the user in the first image;
   capturing, via the user input device, while the second speech is being received, a second image of the face of the user;
   determining, using the control circuitry, a second relative size of the face of the user in the second image;
   comparing, using the control circuitry, a relative size difference between the first relative size of the face of the user and the second relative size of the face of the user to a threshold relative size;
   based on comparing the relative size difference between the first relative size of the face of the user and the second relative size of the face of the user to the threshold relative size, determining, using the control circuitry, that the relative size difference is greater than the threshold relative size; and
   wherein generating the corrected input is further based on determining, using the control circuitry, that the relative size difference is greater than the threshold relative size.

5. The method of claim 1, further comprising:
   comparing, using the control circuitry, the time difference between the second time and the first time to another threshold time;
   based on comparing the time difference between the second time and the first time to the other threshold time, determining, using the control circuitry, that the time difference between the second time and the first time is greater than the other threshold time; and
   wherein generating the corrected input is further based on determining, using the control circuitry, that the time difference between the second time and the first time is greater than the other threshold time.

6. The method of claim 1, further comprising adjusting the threshold time based on an average time between inputs associated with a user.

7. The method of claim 1, further comprising:
   measuring, via the user input device, a baseline environmental noise level;
   measuring, via the user input device, an environmental noise level while the first speech is being received;
   comparing, using the control circuitry, an environmental noise level difference between the environmental noise level while the first speech is being received and the baseline environmental noise level to a threshold environmental noise level;
   based on comparing the environmental noise level difference between the environmental noise level while the first speech is being received and the baseline environmental noise level to the threshold environmental noise level, determining, using the control circuitry, that the environmental noise level difference is greater than the threshold environmental noise level; and wherein generating the corrected input is further based on determining, using the control circuitry, that the environmental noise level difference is greater than the threshold environmental noise level.

8. The method of claim 1, wherein determining the second time when the second speech was received comprises measuring, via the user input device, a time when an earliest pronunciation subsequent to the first time was received.

9. The method of claim 1, wherein determining the first time when the browsing search results were generated for display comprises detecting, using the control circuitry, a time when signals transmitted to pixels of a display screen first changed subsequent to the first time.

10. A system for correcting, based on speech, input generated using automatic speech recognition, in the absence of an explicit indication in the speech that a user intended to correct the input with the speech, the system comprising:
a memory storing a database;
a user input device in communication with control circuitry; and
the control circuitry configured to:
receive, via the user input device, first speech;
determine, using automatic speech recognition, a first input based on the first speech;
retrieve, from the database, browsing search results based on the first input;
generate for display the browsing search results;
determine a first time when the browsing search results were generated for display;
receive, via the user input device, subsequent to receiving the first speech, second speech;
determine, using automatic speech recognition, a second input based on the second speech;
determine a second time when the second speech was received;
calculate a time difference between the second time and the first time;
determine whether the time difference between the second time and the first time is less than a threshold time;
determine that no input associated with the browsing search results was received via the user input device between the first time and the second time; and
in response to determining that the time difference is less than the threshold time and determining that no input associated with the browsing search results was received via the user input device between the first time and the second time, generate a corrected input based on the first input by replacing a portion of the first input with a portion of the second input.

11. The system of claim 10, wherein the control circuitry is configured, when determining that no input associated with the browsing search results was received via the user input device between the first time and the second time, to determine that no input to scroll through the browsing search results, read descriptions of the browsing search results, open the browsing search results, or play the browsing search results was received via the user input device between the first time and the second time.

12. The system of claim 10, wherein:
the control circuitry is further configured to capture, via the user input device, between the first time and the second time, an image of a face of a user; and
the control circuitry is configured to generate the corrected input further based on determining that the face of the user in the image is associated with a dissatisfied emotion.

13. The system of claim 10, wherein:
the control circuitry is further configured to:
capture, via the user input device, while the first speech is being received, a first image of a face of a user;
determine a first relative size of the face of the user in the first image;
capture, via the user input device, while the second speech is being received, a second image of the face of the user;
determine a second relative size of the face of the user in the second image;
compare a relative size difference between the first relative size of the face of the user and the second relative size of the face of the user to a threshold relative size; and
based on comparing the relative size difference between the first relative size of the face of the user and the second relative size of the face of the user to the threshold relative size, determine that the relative size difference is greater than the threshold relative size; and
the control circuitry is configured to generate the corrected input further based on determining that the relative size difference is greater than the threshold relative size.

14. The system of claim 10, wherein:
the control circuitry is further configured to:
compare the time difference between the second time and the first time to another threshold time; and
based on comparing the time difference between the second time and the first time to the other threshold time, determine that the time difference between the second time and the first time is greater than the other threshold time; and
the control circuitry is configured to generate the corrected input further based on determining that the time difference between the second time and the first time is greater than the other threshold time.

15. The system of claim 10, wherein the control circuitry is further configured to adjust the threshold time based on an average time between inputs associated with a user.

16. The system of claim 10, wherein:
the control circuitry is further configured to:
measure, via the user input device, a baseline environmental noise level;
measure, via the user input device, an environmental noise level while the first speech is being received;
compare an environmental noise level difference between the environmental noise level while the first speech is being received and the baseline environmental noise level to a threshold environmental noise level; and
based on comparing the environmental noise level difference between the environmental noise level while the first speech is being received and the baseline environmental noise level to the threshold environmental noise level, determine that the environmental noise level difference is greater than the threshold environmental noise level; and
the control circuitry is configured to generate the corrected input further based on determining that the environmental noise level difference is greater than the threshold environmental noise level.

17. The system of claim 10, wherein the control circuitry is configured, when determining the second time when the second speech was received, to measure, via the user input device, a time when an earliest pronunciation subsequent to the first time was received.

18. The system of claim 10, wherein the control circuitry is configured, when determining the first time when the browsing search results were generated for display, to detect a time when signals transmitted to pixels of a display screen first changed subsequent to the first time.

19. A method for correcting, based on speech, input generated using automatic speech recognition, in the absence of an explicit indication in the speech that a user intended to correct the input with the speech, the method comprising:
- measuring, via a user input device, a baseline environmental noise level;
- receiving, via the user input device, first speech and a first environmental noise level while the first speech is received;
- determining, using control circuitry and automatic speech recognition, a first input based on the first speech;
- retrieving, from a database, browsing search results based on the first input;
- generating for display, using the control circuitry, the browsing search results;
- determining, using the control circuitry, a first time when the browsing search results were generated for display;
- receiving, via the user input device, subsequent to receiving the first speech, second speech;
- determining, using the control circuitry and automatic speech recognition, a second input based on the second speech;
- determining, using the control circuitry, a second time when the second speech was received;
- calculating, using the control circuitry, a time difference between the second time and the first time;
- determining a difference in environmental noise levels between the first environmental noise level and the baseline environmental noise level;
- determining, using the control circuitry, whether the time difference between the second time and the first time is less than a threshold time;
- determining, using the control circuitry, whether the difference in environmental noise levels is greater than a threshold environmental noise level; and
- in response to determining that the time difference is less than the threshold time and determining that the environmental noise level difference is greater than the threshold environmental noise level, generating, using the control circuitry, a corrected input based on the first input by replacing a portion of the first input with a portion of the second input.

* * * * *